(12) United States Patent
Berger et al.

(10) Patent No.: US 6,785,599 B2
(45) Date of Patent: Aug. 31, 2004

(54) METHOD OF OPERATING A VEHICLE TRANSMISSION

(75) Inventors: Reinhard Berger, Bühl (DE); Martin Vornehm, Bühl (DE); Stefan Winkelmann, Bühl (DE); Marc Hauptmann, Bühl (DE); Klaus Henneberger, Bühl (DE); Klaus Küpper, Bühl (DE)

(73) Assignee: LUK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/357,181

(22) Filed: Feb. 3, 2003

(65) Prior Publication Data
US 2003/0114975 A1 Jun. 19, 2003

Related U.S. Application Data

(62) Division of application No. 10/012,701, filed on Dec. 7, 2001.

(30) Foreign Application Priority Data

Jun. 8, 1999 (DE) .......................................... 199 26 024

(51) Int. Cl.[7] .......................... G06F 17/00; F16H 59/00; B60K 17/00
(52) U.S. Cl. .............................. 701/51; 701/34; 701/55; 701/59; 701/61; 701/63; 477/906; 702/58; 74/335; 74/473.1; 74/473.12; 74/473.24
(58) Field of Search .............................. 701/29, 58, 61, 701/62, 51–63, 64, 31, 34; 702/104–105, 113, 116, 182–185, 189, 57, 58, 59, 94, 95; 477/122–128, 197, 216, 906, 907, 34; 74/535, 336 R, 337, 469, 473.1, 473.12, 473.21, 473.24, 473.25, 473.36, 471 XY

(56) References Cited

U.S. PATENT DOCUMENTS

| | | | | |
|---|---|---|---|---|
| 5,117,710 A | * | 6/1992 | Asano et al. | ............. 74/336 R |
| 5,305,240 A | * | 4/1994 | Davis et al. | .................. 702/95 |
| 6,209,408 B1 | * | 4/2001 | DeJonge et al. | ............. 74/335 |
| 6,405,611 B1 | * | 6/2002 | DeJonge et al. | ............. 74/335 |
| 6,499,372 B2 | * | 12/2002 | Rogg | ........................ 74/335 |
| 6,516,255 B2 | * | 2/2003 | Jager et al. | ................... 701/34 |
| 2002/0108457 A1 | * | 8/2002 | Berger et al. | ................ 74/335 |
| 2003/0041683 A1 | * | 3/2003 | Jager et al. | ................... 74/335 |

FOREIGN PATENT DOCUMENTS

| | | | |
|---|---|---|---|
| DE | 197 31 842 | 1/1998 | |
| DE | 198 07 764 | 9/1998 | |
| DE | 198 23 050 | 12/1998 | |
| DE | 19823050 A1 | * 12/1998 | ........... F16H/63/40 |
| DE | 199 00 820 | 9/1999 | |

* cited by examiner

Primary Examiner—Jacques H. Louis-Jacques
(74) Attorney, Agent, or Firm—Darby & Darby

(57) ABSTRACT

Specific shift positions of an electrically actuated vehicle transmission, such as first to fifth, neutral and reverse gears, are detected by monitoring one or more characteristic electrical variables, e.g., actuator currents, during a shift movement of the transmission and by correlating increased or decreased levels of current with the arrival at or passage through the specific shift positions.

22 Claims, 11 Drawing Sheets

METHOD OF OPERATING A VEHICLE TRANSMISSION

CROSS REFERENCE TO RELATED APPLICATION

The present application is a divisional of U.S. patent application Ser. No. 10/012,701, filed Dec. 7, 2001, which is hereby incorporated by reference in its entirety.

BACKGROUND OF THE INVENTION

The invention relates to a method of detecting at least one predetermined shift position of a vehicle transmission among a plurality of different shift positions corresponding to different rotary transfer ratios between an input shaft and an output shaft. It further relates to a control device, to a vehicle transmission, as well as the use of the method, the use of the control device, and the use of the vehicle transmission. In addition, the invention also relates to a method of detecting a position change in relation to a reference position of a vehicle transmission.

A transmission in the present context means a device that can be shifted into different states, by an either stepwise or continuous variation, to generate different rotary transfer ratios between two shafts. The transmission is configured as a gear-changing transmission or a cone-pulley transmission, or other appropriate mechanism. The shift processes of the transmission can be controlled automatically or manually, or in a partially automatic mode, or in an automated mode that permits manual intervention by the driver. A transmission in the sense of the present invention can be configured so that shifts from one gear ratio to another cause an interruption in vehicle traction, or it can be configured to perform shifts without interrupting traction.

With preference, the transmission is configured as an automatic transmission which, in the context of the present invention, means a transmission that shifts without interrupting traction. With special preference, however, the transmission is configured as an automated shift transmission, a term which is used in particular for a transmission in which the control of the shift process is automated but causes an interruption in vehicle traction.

Transmissions as well as operating methods for transmissions belong to the known state of the art.

In a manual transmission, the gear shifts are performed manually by the driver. In principle, the driver is free to shift arbitrarily from any gear into any other gear. The driver chooses when to shift gears and which gear to shift into, based on certain criteria. The driver will decide to shift gears particularly in response to the sound of the engine and depending on which of the gears is currently engaged.

Errors in recognizing which gear is currently engaged, errors of shifting into an other than the intended gear, judgment errors about the need to shift gears, or other mistakes can cause damage to a transmission or can stall the engine of a vehicle. This kind of situation can occur, for example, in a vehicle coasting downhill with the transmission set to the neutral position, if the driver's foot is on the gas pedal so that the engine runs at a high rpm rate but the driver erroneously believes the transmission to be in first gear and therefore shifts into second gear.

Also known are automated shift transmissions in which the shifts are actuated by two electric motors. The electric motors apply a force to a shifter finger. The shifter finger moves in a pattern that consists of a selector track (also called neutral track) and shift tracks branching off from the selector track. The first of the electric motors moves the shifter finger in the direction of the shift tracks which terminate at the different gear positions, while the second of the electric motors moves the shifter finger in the direction of the selector track where the transmission is in the neutral state.

The shifter finger position is monitored by displacement sensors which are arranged at the electric motors and work according to an incremental detection principle.

The shifter finger is controlled by the electric motors dependent on the position values generated by the incremental sensors.

Automated shift transmissions of the foregoing description provide a satisfactory level of shifting and driving comfort and an economical way of operating a vehicle.

However, there have been incidents where gear shifts where performed incorrectly by transmissions of this type. Incorrect gear shifts are detrimental to the driving comfort in a vehicle with an automated shift transmission and will shorten the life of the transmission.

OBJECT OF THE INVENTION

The present invention therefore has the objective of providing a method of operating a vehicle transmission, as well as a transmission capable of performing the method, with an at least reduced incidence of incorrect gear shifts, a longer operating life, and an improved level of comfort for the driver and passengers of a vehicle that is equipped with the inventive transmission. In particular, the invention has the objective of providing a method of operating a transmission, as well as a transmission capable of performing the method, wherein the current shift position or shift movements from one position to another can be detected and evaluated more accurately and reliably and wherein detection errors can be corrected, so that detected positions or shift movements reflect the actual positions or movements of the transmission.

SUMMARY OF THE INVENTION

To meet the objective stated above, the invention proposes a method of detecting at least one predetermined gear-shift position of a transmission that has a plurality of different operating states corresponding to different rotary transfer ratios between an input shaft and an output shaft of a vehicle transmission. A transmission that is operable by the inventive method has a shift pattern with a selector track and shift tracks. A first shifter element, in particular a shifter finger, is movable within the shift pattern. The transmission also includes a second shifter element, in particular a shifter shaft or a shift rod. The transmission is further equipped with an actuator device running under the control of an electrical control device to actuate at least one of the first and second shifter elements. At least one position-sensor device is provided in the transmission to determine the position of a movable element of the transmission.

The method according to the invention has the following steps:

a) When a set of predetermined conditions are present, an actuating force is applied by the actuator device to at least one of the shifter elements in accordance with a predetermined characteristic.
b) At least one characteristic electrical variable of the actuator device and/or the control device, particularly an electric current, is monitored as a function of time.
c) The profile of the electrical variable as a function of time is evaluated according to a predetermined evaluation characteristic to determine a shift position that the transmission is set at. This determination is based on a functional dependency between the time profile of the characteristic electrical variable and the shift position. The shift positions to be determined by the inventive method include in particular at least one end position of a shift-track and/or at least one specific position in the selector track and/or any position in the selector track.

The second shifter element, which consists of a shifter shaft, a shift rod, a shift fork, or a similar element, is connected to the first shifter element.

The arrangement of a selector track and shift tracks, as well as the first and second shifter elements, are part of a gear-shifting mechanism.

At least one movable element of the gear-shifting mechanism, such as the first or second shifter element, can be subjected to actuating forces under the control of an actuator device, causing the element to move, at least to the extent that the movement is not prevented by other factors or elements of the mechanism, such as end stops.

An actuator device in the sense of the present invention is a device that can convert one form of energy into another, generating an output that actuates the shift mechanism or at least one of the movable elements of the shift mechanism. In particular, the actuator device has at least one electric motor that converts electrical energy into mechanical motion. With preference, the actuator device has two electric motors. The first motor, referred to as selector motor, can exert on the first shifter element a force in the direction of the selector track. The second motor, referred to as shifter motor, can exert on the first shifter element a force in the direction of the shift tracks.

A shift track in the sense of the invention can mean a physically existing shift track or a virtual shift track containing a position of the first shifter element where a predetermined gear or a predetermined rotary transfer ratio of the transmission is engaged, or it can mean a pair of shift tracks branching off from a given point of the selector track.

A virtual track means a concept where the shifter element can move only along certain track-like paths, constrained by the nature of control signals generated by the actuator device or the control device.

The actuator device is controlled by a control device.

A control device in the sense of the invention means in particular a device that supplies control signals and/or energy to the actuator device in accordance with a predetermined characteristic. In particular according to the inventive concept, the nature, duration, timing, direction, orientation, and force of the action exerted on the shift mechanism by the actuator device depends on the signals and/or on the flow of energy transmitted from the control device to the actuator device.

The invention provides in particular that the control device supplies the actuator device with current, i.e., with electrical energy, according to a predetermined characteristic.

A control device in the sense of the invention can be designed to provide energy and/or to control either the actuator device alone or at least one other device in addition to the actuator device, for example a clutch. Under a preferred concept of the present invention, the control device controls the actuator device through one or more voltage signals which may be of a set magnitude or variable according to a predetermined characteristic.

According to the invention, the transmission is equipped with a position sensor device that serves to detect shift positions by sensing the positions of components that are moved in the process of shifting.

A position sensor device in the present context means a device by which a position or a change of position can be detected in absolute or relative terms. In particular, the position sensor device can consist of a device that measures the length of a linear displacement or the angle of a rotary displacement. In particular, the position sensor device is configured to perform either an absolute measurement or an incremental measurement.

According to the invention, the actuator device will in the presence of certain conditions exert a force on at least one of the shifter elements in accordance with a predetermined characteristic, while during the actuation at least one characteristic electrical variable of the control device and/or the actuator device is detected and/or monitored as a function of time.

A characteristic electrical variable in the sense of the present invention is in particular a voltage or a current.

With preference, the characteristic electrical variable to detect or monitor is the total amount of current consumed and/or generated by the control device and/or the current consumed by the selector motor and/or the current consumed by the shifter motor and/or the current consumed by the actuating device. In particular, the process is voltage-controlled, where voltage signals are given according to a predetermined characteristic, and the currents flowing as a result of the voltages are monitored or detected.

Instead of monitoring a current, it is also possible within the scope of the invention to monitor another characteristic electrical variable. To represent the invention in simple terms, the example of a voltage controlled method is explained, in which a predetermined current is monitored or detected. However, the invention also includes concepts where another first characteristic electrical variable is used instead of a current, or another second characteristic electrical variable is used instead of a voltage.

According to the invention, the characteristic electrical variable, meaning the current in the case of the representative example, is evaluated as a function of time according to a predetermined evaluation characteristic in order to determine at least one of the shift positions of the transmission.

The predetermined shift positions that can be detected by one of the embodiments of the inventive method are in particular one or more of the shift-track end positions and/or the neutral position and/or any position where the first shifter element is located in the selector track.

The invention provides in particular that the evaluation of the current as a function of time will indicate when the first shifter element is positioned at a dead end, detents, specific locations within a track, or it will indicate in which track the shifter element is currently positioned.

The invention will be explained in further detail through the example of a transmission with a shifter finger, where the latter is representative of any kind of first shifter element.

In the present context, if a first shifter element or shifter finger is said to run against a stop, dead end, or boundary, the latter terms are understood to mean either an actual physical barrier or the occurrence of an effect that is comparable to a physical barrier. An effect comparable to an actual physical barrier means in particular that another element that is coupled to the movable element is running into a stop or is otherwise constrained from continuing its movement. A constraint that prevents a continued movement can be realized in particular by a preset limit in the control device or the actuator device. For example, an electric motor can be controlled so that it is switched off when reaching a predetermined amount of displacement in a given direction under a given set of conditions.

In the present context, if a movable element such as the first element or shifter finger is said to have reached an indent in a surface profile, or a detent, this means that the element is engaged in an actual physical detent or an analogous position-defining feature, or that another element that is coupled to the first element has a detent feature that is in an engaged position.

The invention has the advantage that predetermined positions of the transmission can be safely recognized even in case of a failure of the position sensor device, so that incorrect gear shifts are avoided. For example, the invention provides the possibility of detecting end stops of the transmission, the release of a blocked synchronizer, a detent position for the neutral state, or bias-free, settled positions of the transmission. The invention further provides the possibility that the position sensor device will adapt itself to these positions.

As a preferred concept, a method according to the invention can be used as an emergency mode that is used under a predetermined set of conditions. In particular, the emergency mode is started if the position sensor device has been found to produce faulty information or if it has failed completely, or produces signals that are contradicted by other factors.

In accordance with a particularly preferred embodiment of the invention, the electric current that is being monitored depends on the activities of the selector motor and/or the shifter motor in accordance with a predetermined characteristic. In particular, the electric current is stronger at times when the selector- and/or shifter motor is running. When the selector- and/or shifter motor consumes an increasing amount of power, the monitored electric current will likewise show an increase.

The invention provides in particular, that starting and braking currents are taken into account in the evaluation in accordance with a predetermined characteristic.

According to a particularly preferred embodiment of the invention, the monitored electric current depends in a predetermined characteristic manner on the travel path of the shifter finger and/or on the force that is exerted on the shifter finger by the actuator device.

Preferred is a concept where the electric current represents a combined characteristic effect of the activities of the selector- and/or shifter motor, the travel path of the shifter finger and/or the force acting on the shifter finger.

In particular, the invention provides that variable amounts of resistance opposing a movement of the shifter finger will have an influence on the electric current. In particular, by monitoring the current as a function of time, it is possible to determine whether the shifter finger is being pushed against an end stop and/or is positioned at an end stop and/or is running through a detent position and/or is located at a detent position and/or whether a movement of the shifter finger in a shift track has arrived at the selector track, or other information about the movement and/or position of the shifter finger. As a particularly preferred concept of the invention, detented positions of the shifter finger are associated with predetermined positions of the transmission, particularly the neutral state and/or a bias-free position in which a gear is engaged and/or at least one position within the selector track where a shift track branches off, or other characteristic positions of the transmission.

According to a particularly preferred embodiment of the invention, the current-monitoring function is performed on the total current of the control device and/or a current inside the shifter motor and/or the power current supplied to the shifter motor and or a current inside the selector motor and/or the power current supplied to the selector motor.

A highly preferred embodiment of the inventive method provides that the total current of the control device is monitored, but that the control device supplies current only to the actuator device alone and/or only to the shifter motor alone and/or only to the selector motor alone during the time period that is being monitored or evaluated.

Preferably, the current supplied to other consumer devices in the vehicle is measured in accordance with a predetermined characteristic and taken into account in the evaluation of the overall current balance.

As a preferred concept, the current as a function of time is used under certain conditions to detect when the shifter finger has reached the end point of a lateral constraint, for example when the shifter finger moves out of a shift track into the selector track. To make this detection possible, the shifter motor and the selector motor are both under power during the movement in the shift track, but as long as the shifter finger is prevented from moving in the selector direction, the selector motor is stalled and its current flow is therefore increased. As soon as the shifter finger has reached the selector track and is thus free to move in the selector direction, the current decreases. The decrease in the total current can serve as an indication that the shifter finger has reached the selector track.

According to a particularly preferred embodiment of the invention, the shifter motor is switched off or, in more general terms, the actuation in the shift direction is terminated after detecting that the shifter finger has reached the selector track.

Also among the preferred concepts, the actuation in the shift direction may be continued for a predetermined time period or a predetermined distance after the shifter finger has reached the selector track.

With particular preference, the switch-off point in the shift direction is adapted to the geometry of the selecting/shifting track pattern as well as to the geometry of the shifter finger. With special preference, after reaching the selector track, the shifter finger is brought into a position in which it can move in the selector track with a minimal amount of friction and/or without touching the lateral boundaries of the selector track.

According to a particularly preferred embodiment of the invention, after detecting that the shifter finger has reached the selector track, it is moved to a predetermined position in the selector direction. According to the invention, the predetermined position is a boundary of the selector track, in particular one of the end barriers limiting the selector track in the lengthwise direction.

The move to an end barrier of the selector track can occur immediately following the detection that the shifter finger has reached the selector track. Also among preferred concepts, the move to an end barrier of the selector track is performed independently of whether or not the arrival of the shifter finger at the selector track has been detected. As a particularly preferred concept of the invention, the move to the end barrier of the selector track serves to make an adjustment to the position sensor device in the selector direction. This procedure may be used, e.g., in a case where the position-sensor device for the shift direction is working correctly, but the detection in the selector direction is incorrect or has failed.

In accordance with the invention, the current of the selector motor or the total current of the actuator device is monitored while an actuator force is applied in the selector direction.

With preference, the selector motor is switched off after an end barrier in the selector direction has been reached. Also as a preferred possibility, the selector motor is reversed to run in the opposite direction after reaching an end barrier of the selector track.

Under another preferred concept, the movement of the shifter finger in at least one position is subjected to a local increase or decrease in the opposing force in at least one of the tracks. Under certain conditions, the local variation in the opposing force can manifest itself by an increase or decrease in the actuator current, so that the respective position can be detected by monitoring and evaluating the current.

A local variation in the opposing force can be effected in particular by detents at intermediate positions between the end stops of a track. More specifically, a component coupled to the shifter finger can be equipped with a detent or can be moved into a detented position.

As a practical embodiment of the preceding concept, a second shifter element, in particular a shifter shaft or shifting rod may have a surface profile with depressed and/or raised surface portions. A feeler contact element biased by a spring force follows the profile contour or exerts a force against the contour as the second shifter element moves in relation to the contact feeler element. This creates a variable force opposing or assisting the movement of the second shifter element, dependent on the location where the contact feeler element is positioned on the profile, and also dependent on the direction of movement of the second shifter element. For example, a profile depression is arranged in at least one fully engaged and bias-free gear position and/or in the neutral position and/or at predetermined positions of the selector track where at least one shift track branches off.

Following is an example of how a detent arrangement affects the actuator current of a shifter shaft that performs gear shifts through angular as well as axial movements. A single profile depression can be used to detect a position relative to both the shift direction and the selector direction. For example, the profile depression can be arranged at a specific point on the shifter shaft so that the contact feeler element engages the low point of the depression when the shifter finger is at an intersection between the selector track and a shift track.

The foregoing example is used only to illustrate special possibilities of the invention without limiting the scope of the invention in any way. A device where the resistance to the movement of a shifter element is used may also be configured in other ways. Furthermore the location of the movement-opposing or -assisting feature can also be arranged at other essentially arbitrary locations of the selecting/shifting track arrangement. Also, a substantially arbitrary number of different movement-opposing or -assisting features can be employed in an arrangement according to the invention.

As the shifter shaft is moved axially or rotated about its longitudinal axis in the process of selecting and shifting, the contact feeler element will in certain phases move towards a profile depression.

When the selector- or shifter motor is started up, an initial surge in the motor current can be detected, manifesting itself as a peak in the time profile of the current. Subsequently, the current will settle and stay at an essentially constant level until the contact feeler element reaches the profile depression, unless there are other factors influencing the current. Examples of such other influence factors include for example stall conditions where the shifter finger is acted on by a motor, but is constrained by a track boundary.

When the contact feeler element enters the profile depression, in this case a bowl-shaped formation, the spring-biased contact feeler element follows the down slope of the bowl. At first, the contact feeler element moves closer to the central axis of the shifter shaft. After passing through the bottom of the bowl, the contact feeler element (which stays in place while the shifter shaft moves) is pushed back again against the spring force. The interactive force between the contact feeler element and the profile surface is perpendicular to the profile surface at the contact point. Thus, there is a force component assisting the movement in a first phase where the contact feeler element moves towards the bottom of the bowl and opposing the movement in a second phase where the contact feeler element moves away from the bottom of the bowl. Corresponding to the amount of the total force required to maintain the movement, the motor current decreases in the first phase and increases again in the second phase. Thus, a local dip followed by a rise occurs in the profile of the actuator current. The low point of the current can be used to detect when the contact feeler element is at the detent or low point of the bowl-shaped depression. As the detent depression corresponds to a certain position of the shifter finger within the shifting/selecting track pattern, it is therefore possible to detect a position of the shifter finger based on the actuator current.

The foregoing concept can be used to detect for example when a gear is settled into an engaged position, or when the transmission is in the neutral position.

According to a particularly preferred embodiment of the invention, the foregoing concept is used in a such a way that there is a change in the force that opposes the movement of the shifter finger in at least one place between the end stops of a track, and the current profile and/or the change in the opposing force is used to identify which track the shifter finger is moving in. As a preferred possibility, when the shifter finger is actuated in the shifting direction, the arrival at the selector track can be detected from the actuator current. Specifically, a depression in the surface profile would be arranged at the intersection of a shifting track with the selector track. The respective shifting track will preferably have additional profile depressions, which can be detected from the variations in the actuator current as the shifter finger moves along the shifting track. Based on the pattern of depressions detected, it will be possible to detect the position of the selector track.

The foregoing concept of the invention is advantageous insofar as it allows the arrival at the selector track to be detected by actuating the shifter finger in the shifting direction only.

According to a particularly preferred embodiment of the invention, different tracks, and especially different shifting tracks, can be identified or distinguished from each other by monitoring and evaluating the actuator current.

Under the invention, it is in particular envisaged that each shifting track be distinguished by a characteristic number of profile depressions and/or profile peaks or detents. As the shifter finger moves through the shifting track, the profile depressions manifest themselves through local decreases followed by increases in the time profile of the current. Based on the number of profile depressions detected in this manner when moving through a shifting track, the respective shifting track can be positively identified and distinguished from other shifting tracks without the need for measuring signals of a displacement sensor.

The invention proposes the concept of detecting local or transient changes in the force opposing the movement of the shifter finger through the detection of local or transient extremes in the current.

In particular, such extremes include maxima and minima.

In particular, an increase followed by a decrease in the opposing force, as would occur at a profile peak, manifests itself as a local or transient peak followed by a dip in the actuator current. A decrease followed by an increase in the opposing force, as would occur at a profile depression, manifests itself as a local or transient dip followed by a peak of the actuator current.

In accordance with a particularly preferred embodiment of a method according to the invention, certain gear positions are detected according to a predetermined characteristic relationship, particularly as part of an emergency procedure. Particularly preferred is a concept where the transmission does not shift through all of the gears when performing the emergency procedure.

In particular, the invention proposes the concept for an emergency procedure to shift into gear positions in shift tracks that are distinguished by an end stop, detent, or other movement-resisting feature in the selector track at the point where the respective shift track branches off from the selector track.

A typical case in point is the double-H shift pattern, i.e., a shifting/selecting track arrangement with three selector track positions where shift tracks take off from the selector track, so that the transmission can be shifted into a total of six different gears. Under an emergency procedure as described above, the transmission would move into the shifting tracks that branch off from the end point of the selector track. Typically, this means shifting into first, second, fifth and reverse gears. It is particularly preferred if the transmission also finds and positively identifies the neutral position during this emergency procedure. In a particularly preferred embodiment for a shift pattern where fifth and reverse gears branch off at essentially the same selector position, the transmission will search for neutral, first and/or second, and reverse gears.

A four-track pattern is defined as a shifting/selecting track pattern where reverse, first, third and fifth gears lie in parallel shift tracks in the upper half of the pattern, and where second and fourth gears lie opposite first and third, respectively, in the lower half of the pattern.

Preferably, a detent or resistance barrier is arranged in the selector track between the branch-off point for first/second and the branch-off point for reverse gear.

In the search procedure, the shifter finger is moved towards this resistance barrier with a limited actuator force, so that the barrier, e.g., in the form of a profile peak, cannot be overrun without increasing the actuator force. This resistance barrier, which can also have the form of a profile depression, may likewise be used to find and move into the first and second gear positions under the emergency procedure.

As a preferred feature for an emergency procedure, after the shifter finger has reached an end of the selector track and is about to move from there into a shift track, the shifter finger is subjected to a continuing but preferably small force in the selector direction towards the end stop, to ensure that the shifter finger finds its way into the shift track.

In accordance with a particularly preferred embodiment of the invention, when searching for a predetermined gear position and before the shifter finger has entered the respective shift track, an appropriate step is taken to confirm that the shifter finger is in the correct selector position from which the targeted shift track branches off. This confirmation can be achieved, e.g., by taking the direction of travel into account in which the shifter finger was moving prior to reaching the branch point on the selector track.

For example, in a double-H shift pattern where the shifter finger has reached an end stop of the selector track while traveling with a first sense of direction, it can be confirmed that the end stop for that traveling direction belongs to the branch point for first/second gears. If the shifter finger has been moving in the opposite direction, it can be confirmed that the end stop for that traveling direction belongs to the branch point for reverse/fifth gears.

While the transmission searches for the different gear positions, the current is monitored, so that the end stops, detents, or other barrier features can be detected from the behavior of the current. The movement of the shifter finger can be directed dependent on the behavior of the actuator current, so that the shifter finger is moved in a shift-track direction when the correct position has been reached.

In accordance with a particularly preferred embodiment, the inventive concepts are used in a phase of gear engagement, particularly under an emergency procedure, to detect the point of synchronization and/or the unlocking of the synchronization and/or the arrival at the end position of the shift track, and or the unbiased, engaged gear position.

The point of synchronization in the present context means the position at which the gears of a particular gear level are about to enter into meshing engagement. At this point, it will be necessary in certain situations for one of the gears to turn by a small amount in relation to the other before the tooth profiles can mesh with each other.

A completed synchronization or unlocked condition in the present context means a state where the gears of the ratio level to be engaged are in a position where the tooth profiles can move into engagement without the lateral tooth flanks blocking each other, which would constitute a kind of lock.

The invention proposes the concept of detecting one or more of the aforementioned positions or events on the basis of the actuator current.

For example, a point of synchronization can be detected by the fact that gears whose lateral flanks have come into mutual contact can under certain conditions at least temporarily prevent the gears from meshing with each other, so that further movement is blocked at least until the blockage is released. This locked condition causes a momentary increase in actuator current. When the current returns to a lower level, this indicates that the blocked condition has ended.

When a renewed increase in actuator current is detected after a predetermined time interval, this can be used as an indication that the shifter finger has reached the end of the shifting track.

Preferably, the actuation of the first shifter element in the shifting direction for shifting into first gear is terminated when the end of the shifting track has been detected.

According to a particularly preferred embodiment of the invention, the actuation in the shifting direction is continued for a predetermined time period after a resistance barrier has been detected in the shifting track. This has the purpose of distinguishing temporary barriers such as a blocked synchronizer process from permanent barriers such as the end of the shifting track. This distinction is particularly important if at the time of putting the transmission in gear, the tooth profiles happen to be mutually positioned so that their lateral tooth flanks are not interfering with each other, in which case no blockage occurs.

According to a particularly preferred embodiment of the invention, a shake-down phase is performed when the end stop of a shifting track has been detected in the course of shifting the transmission into gear.

A shake-down phase in the present context means a pulsating actuation of a movable element of the transmission. This can be achieved by driving the selector- and or shifter motor with voltage pulses of alternating polarity for a predetermined amount of time. The alternating pulses are for example in a range between 0.3 and 5 volts. Preferred are pulses between 0.3 and 3 volt, with special preference for pulses between 0.5 and 2 volt.

The shake-down causes the shifter finger and/or a component coupled to the latter to settle into an unbiased (force-free) equilibrium position.

Subsequently, the actuation of the shifter finger is terminated after a predetermined time period has elapsed.

As a preferred concept of the invention, after the unbiased position has been found, a plausibility test is performed whether the actually engaged gear is the one that was intended. This can be established by checking whether the ratio between the engine rpm rate and a wheel rpm rate correlates correctly with the intended transmission ratio.

According to a particularly preferred embodiment, a shake-down phase is performed when the transmission is put into neutral, so that the shifter finger and/or transmission components coupled to the latter will settle into an unbiased condition.

A process according to the inventive method is started with preference after detecting certain kinds of faults of the sensor device and/or the actuator device and/or the control device. A fault in the present context means in particular any impairment of functionality. A fault in the present context can also mean a loss of confidence in the position values determined by the position sensor device. The loss of confidence can occur, for example, if blockages of shift movements occur at unexpected times or in unexpected positions.

According to a particularly preferred embodiment of the invention, a determination of a position through one of the procedures of the inventive method may under certain conditions be performed as a redundant measure, for the purpose of adapting the position sensor device or its output values to changes in the system.

According to a particularly preferred embodiment of the invention, a redundant position information is used to control the transmission only if the values generated by the position sensor device have positively been found to be faulty.

The invention provides a further operating method for a vehicle transmission in which predetermined shift positions, in particular at least one position of full engagement of a gear and/or at least one position in the selector track, are associated with profile depressions that are arranged on a movable element. The method includes the following steps:

a) Under predetermined conditions and in accordance with a predetermined characteristic, the transmission is actuated to seek a position that is associated with a profile depression.

b) A shake-down or vibratory movement is carried out to settle the first element (or another element coupled to the latter) into an essentially unbiased, force-free position, after detecting that the contact feeler element has substantially arrived at the depression. The shake-down movement is generated by applying an alternating pulsating force to at least one shifter element, so that the shifter element is at least once pushed quickly back and forth.

The invention provides a further method of detecting a change in position, or detecting a position relative to a reference point in a transmission. This further method includes the step of emulating at least one actuator device by means of a model that is incorporated in the control device. This method, too, applies to a transmission that has different rotary transfer ratios between an input- and output shaft corresponding to the different shift positions.

Shifting the transmission into one of the positions requires a movement in the shift direction and in some cases also in the selector direction. The movement in the selector direction is controlled by a first electrically controlled actuator device, and the movement in the shift direction is controlled by a second electrically controlled actuator device. The first and/or second actuator device is equipped with a displacement sensor device, and the transmission has at least one electric control device to control the actuator devices.

According to a proposed embodiment of the invention, the actuator device for the selector movement and/or shift movement is emulated in the control device, e.g., through a model of a servo-control loop.

According to a preferred embodiment of the aforementioned method, the command signal by which a position-control unit directs the movements of an actuating device is used also as input for the servo model that emulates the actuator device. As an example, the command signal can be an analog voltage signal.

The output signal delivered by the emulator model is preferably an equivalent counterpart to the signal of the displacement sensor device. The displacement sensor can be realized, e.g., by an incremental position sensor, in which case the output signal of the emulation model is preferably made available in terms of angular increments or in radian units.

It is particularly advantageous if the emulation model of an actuator device is based on characteristic variables or design data and/or at least one measured quantity of the actuator device. If the latter consists of a rotary drive mechanism, the characteristic variables can consist in particular of an rpm rate and/or a rotary acceleration, or of variables from which a rotary speed or acceleration can be calculated. If an electric motor such as a DC motor is used as a drive source, the characteristic design data used in the emulator model can, e.g., consist of the moment of inertia of the rotor, the electrical resistance of the rotor, and/or a torque constant. For a measured quantity, it is advantageous to use an rpm-dependent friction of the motor.

The use of an emulator model of the actuator device represents a particularly advantageous means for detecting a failure and/or malfunction of the displacement sensor. In practice, the fault recognition is based on calculating and evaluating the difference between the respective output signals of the displacement sensor device and the emulator model. A fault is indicated if the difference exceeds a given threshold. It is practical to set the sensitivity of the fault recognition through an appropriate selection of the threshold value, preferably taking the accuracy of the emulator model and possibly other factors into account. In one advantageous embodiment, an on/off hysteresis is used for an indicator flag signaling a fault or malfunction.

If a failure and/or malfunction has been recognized, appropriate measures are taken such as, e.g., initiating a special strategy for operating faults and/or making an entry into a fault memory.

In regard to a special strategy for operating faults, reference is hereby made to the German Patent Application Publication DE 199 00 820, the content of which is expressly incorporated by reference in the present patent application.

According to a further concept of the invention, an adaptation of the model is advantageously performed at a time when the displacement sensor device is fully functional. In case there is a difference between the output signals of the emulator model and the displacement sensor, the emulator model is adjusted to produce an output that more closely matches the signal of the displacement sensor.

The invention provides a further embodiment of a method which is particularly advantageous for controlling a transmission without the displacement sensor device that is part of the preceding embodiment. In this case, the displacement and/or position relative to a fixed point of the transmission is determined by the emulator model alone.

The scope of the invention also includes control devices that are equipped with a signal-evaluating capability and are operable to perform any of the methods of the foregoing description. Specifically, such control devices electrically control an actuator device that applies an actuating force to a first and/or second shifter element of a transmission, where the first shifter element is movable in a selecting/shifting track arrangement and where the position of at least one of the shifter elements can be detected by a position sensor.

Further included under the scope of the invention are transmissions of the type described above with at least a first shifter element that is movable in selecting/shifting track arrangement, and at least one second shifter element, an electrically controlled actuating device for at least one of the shifter elements, at least one control device for the actuator device, at least one position sensor device to determine the shift position of the transmission at any given time and, in addition, a redundant sensor device performing in certain predetermined situations a redundant determination of the shift position relative to the selector direction.

The invention further includes any transmission capable of performing one or more of the inventive methods described herein.

As a linguistic formality, where the names of features are connected by the word "or", this should be understood in the broadest sense, i.e., either as a logic type of "or" (one or the other or both) or an exclusive "or" (one or the other but not both), whichever fits the context.

The terms "control" and "regulation" and their derivatives are used herein with a broad range of meanings encompassing closed-loop as well as open-loop control of devices, functions and processes, including in particular the DIN (Deutsche Industrie-Norm) definitions for regulation and/or control).

The novel features that are considered as characteristic of the invention are set forth in particular in the appended claims. The inventive method itself, however, both as to its mode of operation and its application in a motor vehicle, together with additional features and advantages thereof, will be best understood upon perusal of the following detailed description of certain presently preferred specific embodiments with reference to the accompanying drawing.

BRIEF DESCRIPTION OF THE DRAWINGS

The embodiments of the invention as described and illustrated are intended to serve as examples only, and no limitations are thereby implied. The description refers to the attached drawings, wherein.

DETAILED DESCRIPTION OF THE INVENTION

Figure 1:
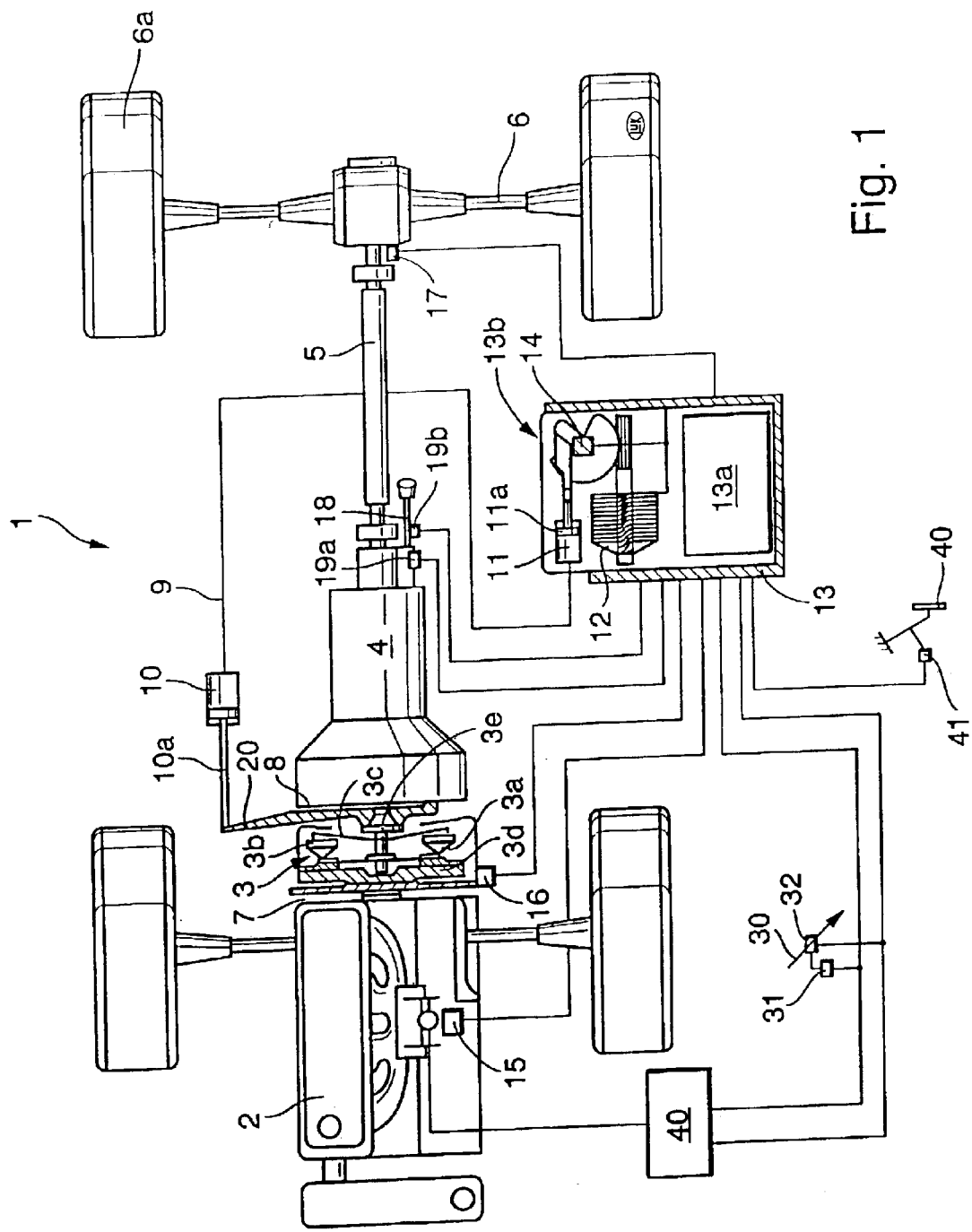
FIG. 1 represents a schematic view of a first vehicle in which the inventive method may be used.

FIG. 1 gives a schematic view of a vehicle 1 with a drive unit 2 such as a motor or combustion engine. The power train of the vehicle further contains a torque-transmitting device 3 and a transmission 4. The illustrated example shows the torque-transmitting device 3 arranged in the torque flow path between the engine and the transmission, so that the driving torque generated by the engine is passed on by way of the torque-transmitting device 3, the transmission 4, the drive shaft 5, and the driving axle 6 to the wheels 6a.

The torque-transmitting device 3 is configured as a clutch, such as a friction clutch, laminar disc clutch, magnet powder clutch, or converter bypass clutch. The clutch may be of the self-adjusting, wear-compensating type. The transmission 4 is shown as a manual shift transmission in which the transmission ratio is changed in steps. However, under the concept of the invention, the transmission may also be an automated shift transmission in which the shifting process is automated by means of at least one actuator. The term "automated shift transmission" further means an automated transmission of a type where the tractive force is interrupted during gear shifts and where the shifting from one transmission ratio to another is performed by means of at least one actuator.

It is also possible to use a conventional automatic transmission of the type that works without interrupting traction during gear shifts and is normally based on planetary gear stages.

As a further possibility, a transmission with a continuously variable rotary transfer ratio, such as for example a cone-pulley transmission, may be employed in embodiments of the invention. If a conventional automatic transmission is used, the latter may be equipped with a torque-transmitting device 3, e.g., a clutch or friction clutch, arranged at the output side of the transmission. The torque-transmitting device can further be configured as a start-up clutch and/or as a reverse-gear clutch and/or as a safety clutch in which the magnitude of the transmittable torque can be controlled at a targeted level. The torque-transmitting device can be a dry friction clutch, or a so-called wet-running friction clutch that runs in a fluid, or it may consist of a torque converter.

The torque-transmitting device 3 has an input side 7 and an output side 8. A torque is transmitted from the input side 7 to the output side 8 through a contact force that is applied to the clutch disc 3a by means of the pressure plate 3b, the diaphragm spring 3c, the release bearing 3e, and the flywheel 3d. The force is generated by an actuator pushing or pulling the release lever 20.

The torque-transmitting device 3 is controlled by means of a control unit 13 which may be configured as a control device with an electronic module 13a and an actuator 13b. In another advantageous embodiment, the actuator and the electronic module may also be accommodated in two separate subassembly units or housings.

The control unit 13 may contain the electronic circuits for the control as well as for the power supply of the electric motor 12 of the actuator 13b. This has the advantage that only one compact portion of space is needed for both the actuator and the electronics. The actuator consists of a motor 12, typically an electric motor driving a hydraulic master cylinder 11 through a gear mechanism such as a worm gear mechanism, a spur gear mechanism, a crank mechanism, or a threaded spindle mechanism. The master cylinder may be driven directly or by way of a rod linkage.

The movement of the output element of the actuator, i.e., of the piston 11a of the master cylinder 11, is detected by a clutch travel sensor 14 which senses a position, or the speed or acceleration of a change in position, of an element whose displacement, speed or acceleration is in direct proportion to the displacement, speed or acceleration of the clutch. The master cylinder 11 is connected through a pressure conduit 9, normally a hydraulic line, to the slave cylinder 10. The output element 10a of the slave cylinder is coupled to the release lever or release element 20. Thus, a movement of the output element 10a of the slave cylinder 10 causes the release element 20 to be moved or tilted to effect a controlled variation of the amount of torque that is transmitted by the clutch 3.

The actuator 13b that controls the torque-transmitting device 3 may be based on a pressure-propagation principle, using a master cylinder and slave cylinder communicating through a pressure medium. The pressure medium can be a hydraulic fluid or a pneumatic medium. The master cylinder may be driven by an electric motor 12 that is electronically controlled. However, instead of an electric motor, the driving element of the actuator 13b may also be based on another drive source, e.g., driven by hydraulic pressure. It is also conceivable to use magnet-based actuators to set a position of an element.

The amount of torque transmitted through a friction clutch is controlled to a targeted level by applying pressure on the friction linings of the clutch disc between the flywheel 3d and the pressure plate 3b. The force that is exerted on the pressure plate and on the friction linings is controlled by the position of the release element 20, whereby the pressure plate is moved to or set and held at any position between two end positions. One end position represents a fully engaged condition of the clutch, and the other end position represents a fully disengaged condition. To set the transmittable torque at an amount that is less than the current engine torque, the pressure plate 3b is moved to a position that lies in an intermediate range between the end positions. By controlling the release element 20 to a set target, the clutch can be held at the targeted position. However, it is also possible to set the transmittable torque above the level of the current engine torque. In this case, the torque generated by the engine is passed on by the clutch, while torque fluctuations, especially abrupt peaks in the torque flow, are damped and/or isolated.

The control and regulation of the torque-transmitting device further relies on sensors which at least part of the time monitor the relevant factors and provide the status data, signals and measurement values that are necessary for the control and are processed by the control unit. The latter may also have communication lines to other electronic units such as, e.g., an electronic engine control unit, or an electronic control of the anti-lock braking system (ABS), or an anti-slip regulation (ASR). The sensors detect, for example, rpm rates of the vehicle wheels or of the engine, the position of the gas pedal, the position of the throttle valve, the currently engaged gear level of the transmission, driver-generated inputs that indicate an impending gear change, and other characteristic information specific to the vehicle and the operating situation.

FIG. 1 shows a throttle valve sensor 15, an engine rpm sensor 16, as well as a vehicle speed sensor 17, which relay measurement data and information to the control device. The electronic unit, such as a computer unit that is part of the control unit 13a, is processing the incoming data and issues control commands to the actuator 13b.

The transmission is configured as a step-shifting transmission, in which the transmission ratio is shifted in discrete, fixed steps by means of a shift lever. The shift lever may operate or actuate the transmission directly. There is further at least one sensor 19b arranged at the shift lever 18 of the manual shift transmission, which serves to detect when the driver intends to shift gears and/or which gear is currently engaged, and to relay the information to the control device. The sensor 19a is connected to the transmission and serves to detect the currently engaged gear of the transmission and/or to detect a condition that indicates that the driver is about to shift gears. The detection of the driver's intent to shift gears can be realized through the use of at least one of the sensors 19a, 19b, if the sensor is a force sensor that responds to a force acting on the shift lever. Alternatively, the sensor could also be a position sensor or displacement sensor, in which case the control unit would recognize an intent to shift gears from a dynamic change of the position signal.

The control device is at least part of the time in signal communication with all of the sensors and evaluates the sensor signals and input data which, in their totality, are referred to as the current operating point of the torque transfer system. Based on the operating point, the control device issues control and regulation command signals to the at least one actuator. The drive element 12 of the actuator, such as an electric motor, operates under the command of the control unit that controls the actuation of the clutch by means of a command signal that depends on the measurement values and/or the system input data and/or signals of the sensors. The control device has a control program in the form of hardware and/or software, which evaluates the incoming signals and calculates or determines the output quantities based on comparisons and/or functions and/or characteristic data arrays or curve fields.

The control unit 13 is advantageously equipped with units or modules for the determination of torques, gear positions of the transmission, amounts of slippage in the clutch, and/or different operating states of the vehicle, or there are signal connections from the control unit 13 to at least one of the aforementioned modules. The modules or units may be implemented in the form of control programs in hardware and/or software. As a result, the incoming sensor signals allow a determination of the torque of the drive unit 2 of the vehicle 1, the gear position of the transmission 4, the amount of slippage in the torque-transmitting device, as well as the current operating state of the vehicle. The gear-position determining unit detects which gear is currently engaged based on the signals from the sensors 19*a* and 19*b*. The sensors are coupled to the shift lever and/or to internal mechanical elements of the transmission such as, e.g., a central shifting shaft or shifting rod, to detect the position or movement of these elements. There can further be a gas pedal sensor 31 arranged at the gas pedal 30 to detect the position of the latter. A further sensor 32 may consist of a binary on/off switch to indicate when the engine is idling, i.e., the switch 32 is on when the gas pedal is not being depressed, and it is off when the gas pedal is being actuated. The gas pedal sensor 31, in contrast to the on/off switch 32, provides a quantitative signal representing the degree of actuation of the gas pedal.

Further in FIG. 1, a brake-actuating element 40 is shown which serves to apply the service brake or the parking brake. This can be a brake pedal, a hand-brake lever, or a hand- or foot-operated actuating element of the parking brake. At least one sensor 41 is arranged at the actuating element 40 to monitor the actuation of the latter. The sensor 41 may be a digital sensor, e.g., a binary switch for detecting whether the actuating element is in an applied or non-applied state. This sensor may be connected to a signal device such as a brake indicator light to alert the driver that the brake is applied. This arrangement can be used for the service brake as well as for the parking brake. However, the sensor can also be configured as an analog sensor, e.g., as a potentiometer that measures the degree of displacement of the actuating element. This sensor, likewise, can be connected to an indicator signal.

Figure 2:
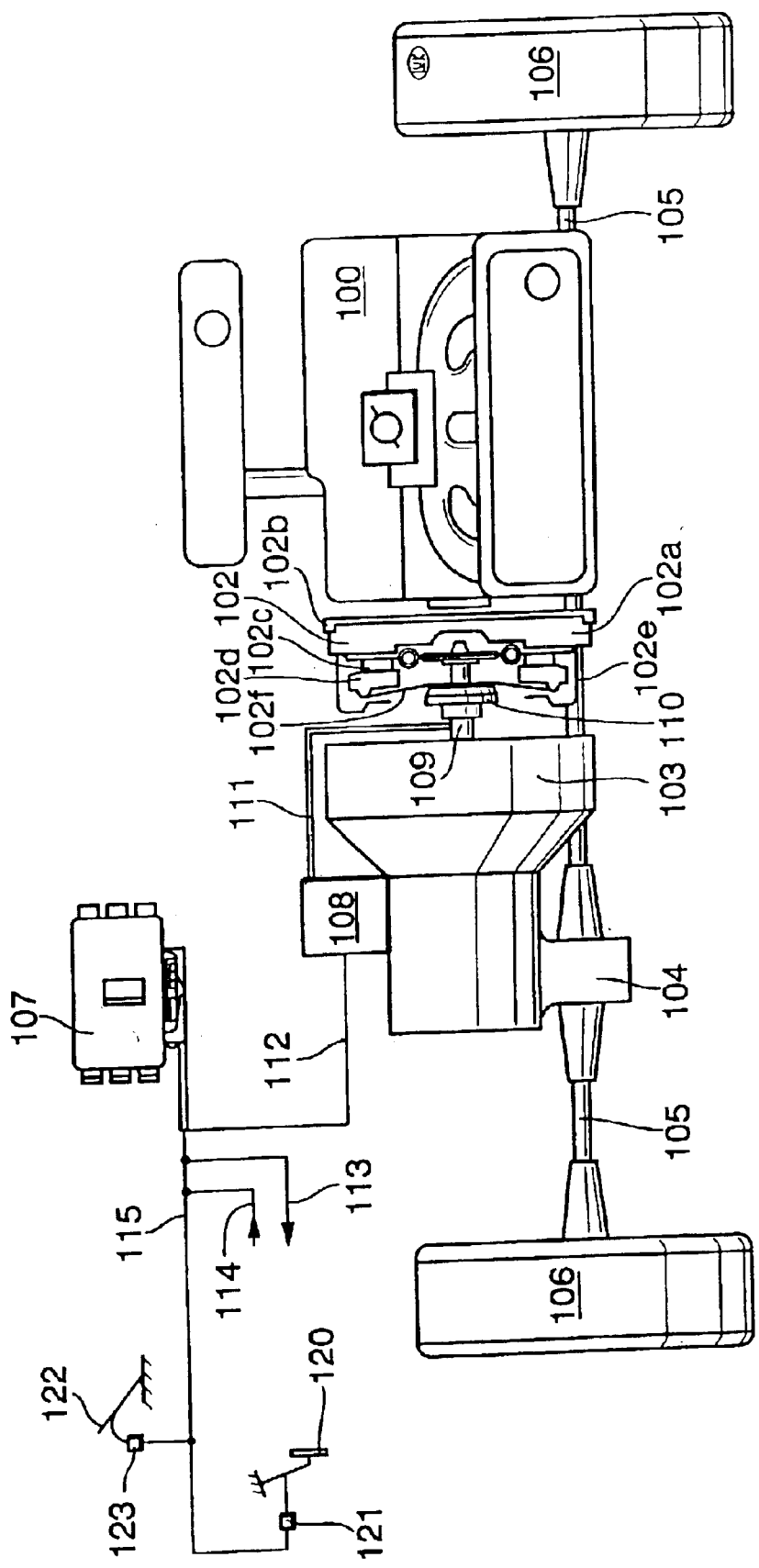
FIG. 2 represents a schematic view of a second vehicle in which the inventive method may be used.

FIG. 2 gives a schematic view of a power train of a motor vehicle with a drive unit 100, a torque-transmitting device 102, a transmission 103, a differential 104, drive axles 105, and wheels 106. The torque-transmitting device 102 is arranged at or connected to a flywheel 102*a*. The latter as a rule carries an external tooth profile 102*b* that serves to start the engine. The torque-transmitting device has a pressure plate 102*d*, a clutch cover 102*e*, a diaphragm spring 102*f*, and a clutch disc 102*c* with friction linings. The clutch disc 102*c* is interposed between the pressure plate 102*d* and the flywheel 102*a* and may be equipped with a damping device. An energy-storing device such as a diaphragm spring 102*f* pushes the pressure plate axially towards the clutch disc. A clutch-actuating element 109 such as a hydraulically actuated concentric slave cylinder is used to actuate the torque-transmitting device. A release bearing 110 is arranged between the concentric slave cylinder and the prongs of the diaphragm spring 102*f*. As the release bearing is moved along the axial direction, it pushes against the diaphragm spring and thereby disengages the clutch. The clutch may be configured either as a push-actuated clutch or a pull-actuated clutch.

The actuator module 108 belongs to an automated shift transmission and includes the actuator unit for the torque-transmitting device. The actuator module 108 operates internal shifter elements such as, e.g., a shift-actuating cylinder or a rod mechanism, or a central shifter shaft of the transmission. The actuation may work in a manner where the gears can be engaged and disengaged in sequential order or in an arbitrary order. The clutch-actuating element 109 is operated by way of the connection 111. The control unit 107 is connected to the actuator through the signal line 112. The control unit 107 is further connected by signal lines 113 to 115. The signal line 114 carries incoming signals. The line 113 carries command signals issued by the control unit. The connection 115, consisting for example of a data bus, exchanges signals with other electronic units.

To put the vehicle in motion or to accelerate the vehicle from a stationary or slow rolling condition, the driver has to use only the gas pedal 30, as the controlled or regulated automatic clutch actuation controls the amount of transmittable torque of the torque-transmitting device. The degree of depression of the gas pedal is detected by the gas pedal sensor 31, and the control unit will accordingly implement a more or less forceful or rapid start-up acceleration. The sensor signals from the gas pedal are used as inputs for the control of the start-up phase of the vehicle.

In a start-up phase, the amount of transmittable torque is set as a control target by means of a given function or on the basis of characteristic curves or curve fields that may be functions of the engine rpm rate. The latter may in turn be dependent on other quantities such as the engine torque, that are correlated to the engine rpm rate through a characteristic relationship.

In a start-up process, essentially from a stationary or crawl-speed condition, if the gas pedal is actuated by an amount a, the engine control device will direct the engine to generate an engine torque of a certain magnitude. The control unit of the automated clutch actuation 13 controls the transmittable torque of the torque-transmitting device in accordance with given functions or characteristic curve fields, so that a stationary equilibrium sets in between the engine torque and the clutch torque. The equilibrium is characterized dependent on the gas pedal displacement a by a specific start-up rpm rate, a start-up torque generated by the engine, a specific amount of transmittable torque of the torque-transmitting device, and a specific amount of traction torque delivered to the drive wheels. The functional relationship between the start-up engine torque and the start-up rpm rate will subsequently be referred to as the start-up characteristic. The gas pedal displacement a is proportionate to the aperture of the throttle valve of the engine.

Further in FIG. 2, a brake-actuating element 120 is shown which serves to apply the service brake or the parking brake. This can be a brake pedal, a hand-brake lever, or a hand- or foot-operated actuating element of the parking brake. At least one sensor 121 is arranged at the actuating element 120 to monitor the actuation of the latter. The sensor 121 may be a digital sensor, e.g., a binary switch for detecting whether the actuating element is in an applied or non-applied state. This sensor may be connected to a signal device such as a brake indicator light to alert the driver that the brake is applied. This arrangement can be used for the service brake as well as the parking brake. However, the sensor can also be configured as an analog sensor, e.g., as a potentiometer that measures the degree of displacement of the actuating element. This sensor, likewise, can be connected to a signal indicator device.

Figure 3:
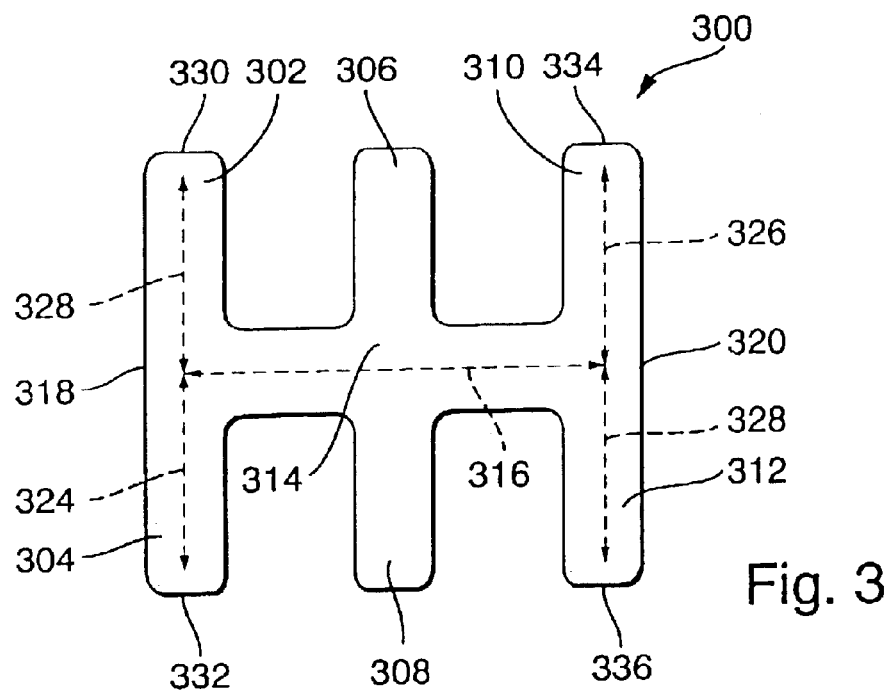
FIG. 3 represents a schematic view of a first shift pattern in which the inventive method may be used.

FIG. 3 illustrates an example of a shift pattern 300 with a selector track and shift tracks, which is part of an arrangement according to the invention and also serves to give a clearer description of a method according to the invention.

The selecting/shifting track pattern 300 in FIG. 3 has the shape of a double-H. The shift tracks 302, 304, 306, 308, 310 belong to the forward gears one through five, respectively, and the shift track 312 belongs to the reverse gear. The shift tracks are connected by the selector track 314.

The method according to the invention serves to detect when the shifter finger is positioned at predetermined end stops or predetermined gear positions. The method can be used, e.g., as an emergency strategy during a temporary failure of a displacement measuring device. It can also be used to calibrate the displacement measuring device in a procedure that is performed as a safety measure at predetermined time intervals.

A method according to the invention will now be discussed in which the gear positions or the end positions of the respective shift tracks are determined in sequence for first, second, fifth and reverse gear. The scope of preferred embodiments also includes other orders of sequence.

The method is discussed for an exemplary case, where the shifter finger (not shown in the drawing) is positioned at the outset in the selector track 314. The starting position of the shifter finger in the selector track 314 may have been detected by an inventive method that is not described in detail within the context of FIG. 3.

The shifter finger (not shown) is pushed by a selector motor along the double arrow 316 towards the end stop 318 of the selector track. During this activity, the current of the selector motor or the total current of a control device directing the selector motor is monitored. For simplicity's sake, the following explanation will consistently refer to the total current of the control device, although the invention includes the possibility of detecting the currents of the shifter motor and selector motor separately.

During a start-up phase of the selector motor, the current profile of the control device will show a temporarily increased current flow which is due to the start-up current of the selector motor. After the starting phase, the current falls to a lower level and stays essentially constant until the shifter finger has reached the end stop 318 of the selector track. After arriving at the end stop 318, the shifter finger continues to be pushed against the end stop by the selector motor, so that the stalled condition can be detected from a strong increase in the current. The position at the end stop 318 can be distinguished from the end stop 320 based on the direction of movement of the shifter finger. The sense of direction can be determined, e.g., by monitoring the signal of an incremental displacement sensor which is used to detect the motion of the shifter finger. As an alternative, a profile indentation or a detent can be arranged at a short distance from the end stop 318 or at an appropriate place of the shifter shaft, which will manifest itself through a local variation of the current profile that will occur at the end stop 318 but be absent at the end stop 320.

After the arrival of the shifter finger at the end stop 318 has been detected, the selector motor is switched off, whereby a negative current is induced which subsequently rises to the zero level. The end stop 318 can also be used as a reference for the calibration of the displacement measuring device in the selector direction. As an alternative to switching off the selector motor, the latter could remain energized to exert a very small force on the shifter finger in the direction of the end stop 318 to ensure that the shifter finger is in fact being moved along the shift track 302. For the movement in the shift track 302, the shifter motor pushes the shifter finger in the direction towards the end stop 330 of the shift track 302. Initially, this will cause a start-up surge of the current which manifests itself as a peak in the current profile. Subsequently, the current decreases and then remains at a substantially constant level until the end stop 330 has been reached. At the end stop 330 the current profile will at first show an increase as the shifter motor is stalled by the end stop 330 opposing further movement of the shifter finger.

After the arrival at the end stop 330 has been recognized, the shifter motor is switched off, so that the inductive switch-off current will cause a dip into the negative of the current profile.

Following this, the shifter motor will push the shifter finger in the opposite direction, and the arrival at the end stop 332 will manifest itself by a current increase. The shifter motor is switched off at this point, which again causes an inductive switch-off current that will manifest itself through a negative transient in the current profile. Next, the shifter motor is energized to push the shifter finger in the opposite direction, causing another start-up surge (transient peak) in the current, whereupon the current level decreases to a substantially constant level. After the selector track 314 has been reached, the shifter motor is switched off and the selector motor is energized to push the shifter finger in the direction towards the selector-track end stop 320. The arrival at the end stop 320 is again detected from a strong rise in the current. In analogous manner, the movement is continued to the end stop 334 of the shift track 310 and subsequently to the end stop 336 of the shift track 312. The positions at the end stops 330, 332, 334, 336 are detected and used for the calibration of the displacement sensor device.

Figure 4:
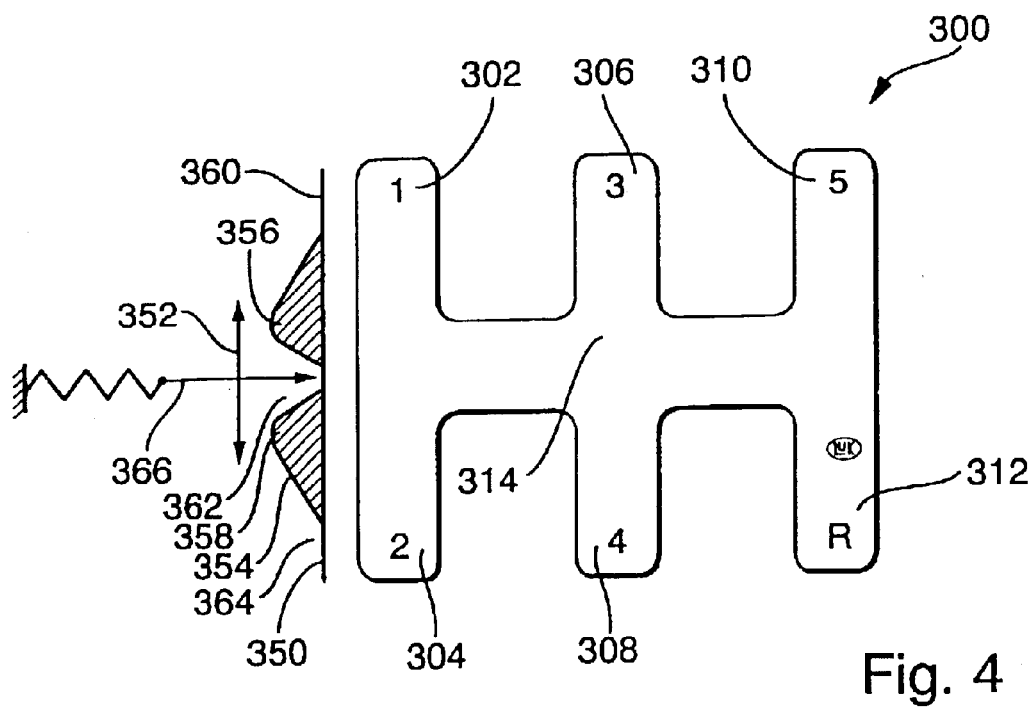
FIG. 4 represents the shift pattern of FIG. 3 correlated with a surface profile on a shifter shaft.

FIG. 4 illustrates the same shifting/selecting track pattern 300 with a schematic representation of a shifter shaft 350 which in accordance with the movement of the shifter finger is moved axially in the shifter direction symbolized by the double-headed arrow 352 or rotated about its axis in accordance with a movement of the shifter finger in the selector direction.

A contour or detent profile 354 is provided on the shifter shaft 350 with profile peaks 356, 358 and profile depressions 362, 364. At a substantially fixed position, a spring-biased contact feeler element (symbolized by the arrow 366) pushes against the profile 354. The axial component of the contact force variably opposes or assists the axial movement of the shifter shaft 350 dependent on the position of the latter. As a consequence, the actuator current profile, which is being monitored during the movement of the shifter shaft 350 or of the shifter finger (not shown in FIG. 4), shows local extreme values when the contact feeler element 366 is at one of the profile depressions 360, 362, 364. An appropriate arrangement of a surface profile cooperating with a contact feeler element 366 can thus be used to detect by way of the actuator current profile when the shifter finger is located at predetermined shift positions or in the selector track.

Figure 5:
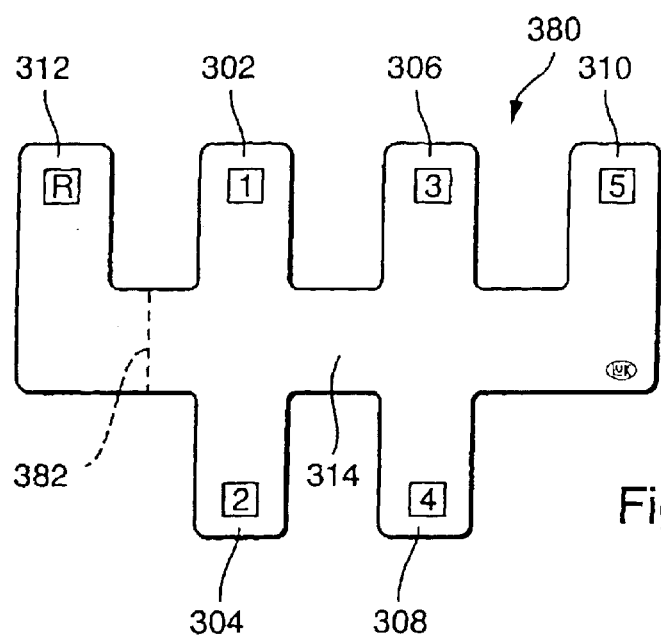
FIG. 5 represents a schematic view of a second shift pattern in which the inventive method may be used.

FIG. 5 illustrates an example of a selecting/shifting track pattern 380 which may be part of a transmission in accordance with the invention, or which can be used to perform a process according to the invention.

The arrangement of FIG. 5 is also referred to as a four-track pattern, where the four tracks belong to reverse, first/second, third/fourth, and fifth gear, respectively.

A reverse-gear barrier 382 is arranged between the shift track 302/304 for first/second gear and the shift track 312 for reverse gear. In the current profile, the reverse-gear barrier 382 manifests itself like an end stop when the shifter finger moves against it, so that the entry into reverse gear can be detected from the actuator current.

Figure 6:
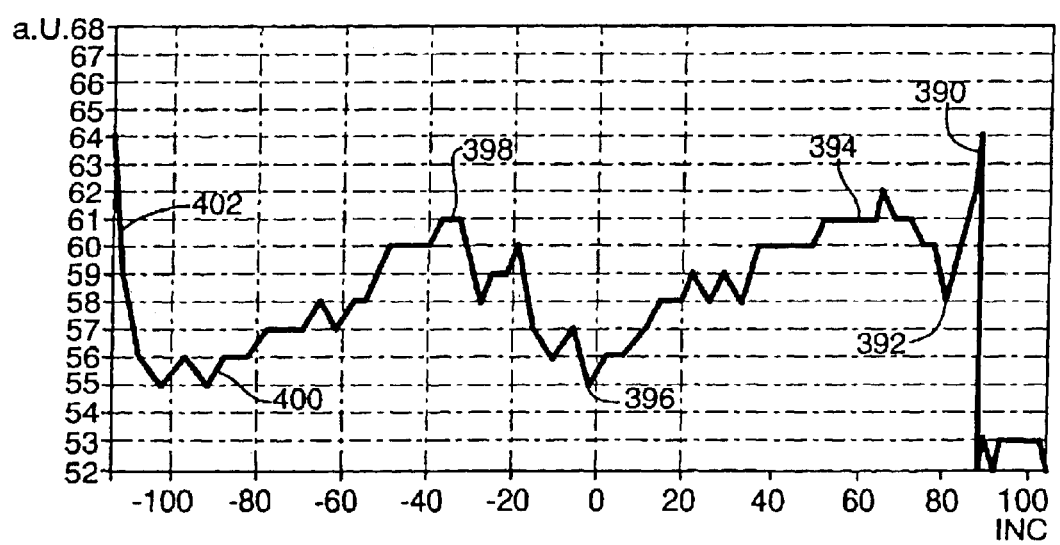
FIG. 6 represents a first example of a signal profile of a characteristic electrical variable that can be used to detect predetermined shift positions.

FIG. 6 illustrates an example of a profile graph of the current (in arbitrary units) of a shifter motor that can occur when the shifter finger moves (as measured in position increments) through a shift track that is associated with a detent arrangement as shown in FIG. 4. When the shifter motor is switched on, the current goes through a start-up surge that manifests itself as a peak in the area 390 of the graph, which is followed by a sharp descent in the area 392. In this phase, the shifter finger is positioned substantially in the surface profile depression 364 (FIG. 4). The continued movement where the contact feeler element 366 glides over the profile peak 358 can be detected from the local maximum 394 of the current in FIG. 6. This is followed by a marked decline of the current towards a local minimum value at 396, which corresponds to the depression 362 in the surface profile 354 of FIG. 4. The position of the contact feeler element 66 in the depression 362 corresponds essentially to a position of the shifter finger in the selector track 314 of the shift pattern of FIG. 4. As the contact feeler element glides over the surface profile peak 356, the current rises to another local maximum at 398 and subsequently falls to a local minimum 400 as the contact feeler element glides into the surface profile depression 360. When the shifter finger has reached the end of the shift track, the stalled condition of the shifter motor can be detected from the strong rise in the current in the area 402 of the graph.

Figure 7:
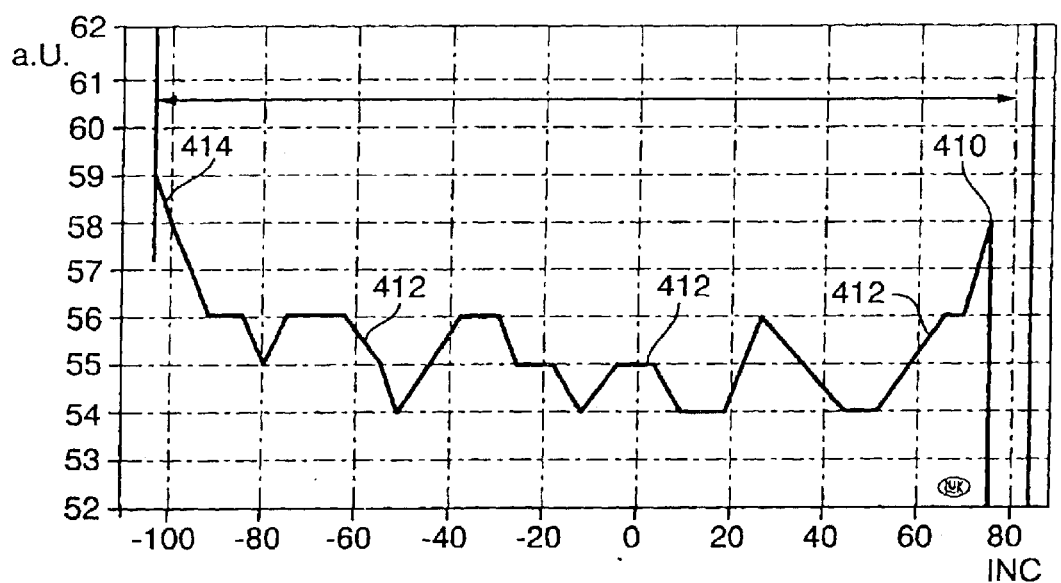
FIG. 7 represents a second example of a signal profile of a characteristic electrical variable that can be used to detect predetermined shift positions.

The graph of FIG. 7 represents the total current of a control device that can occur when the shifter finger travels along the selector track. When the selector motor starts up, a current surge can be detected in the area 410 of the graph. During the movement along the selector track, the current remains essentially constant within ±1 measuring unit, as seen in the portion 412 of the graph. At the end stop of the selector track, a strong current increase of the current can be detected as shown in the area 414 of the graph.

Figure 8:
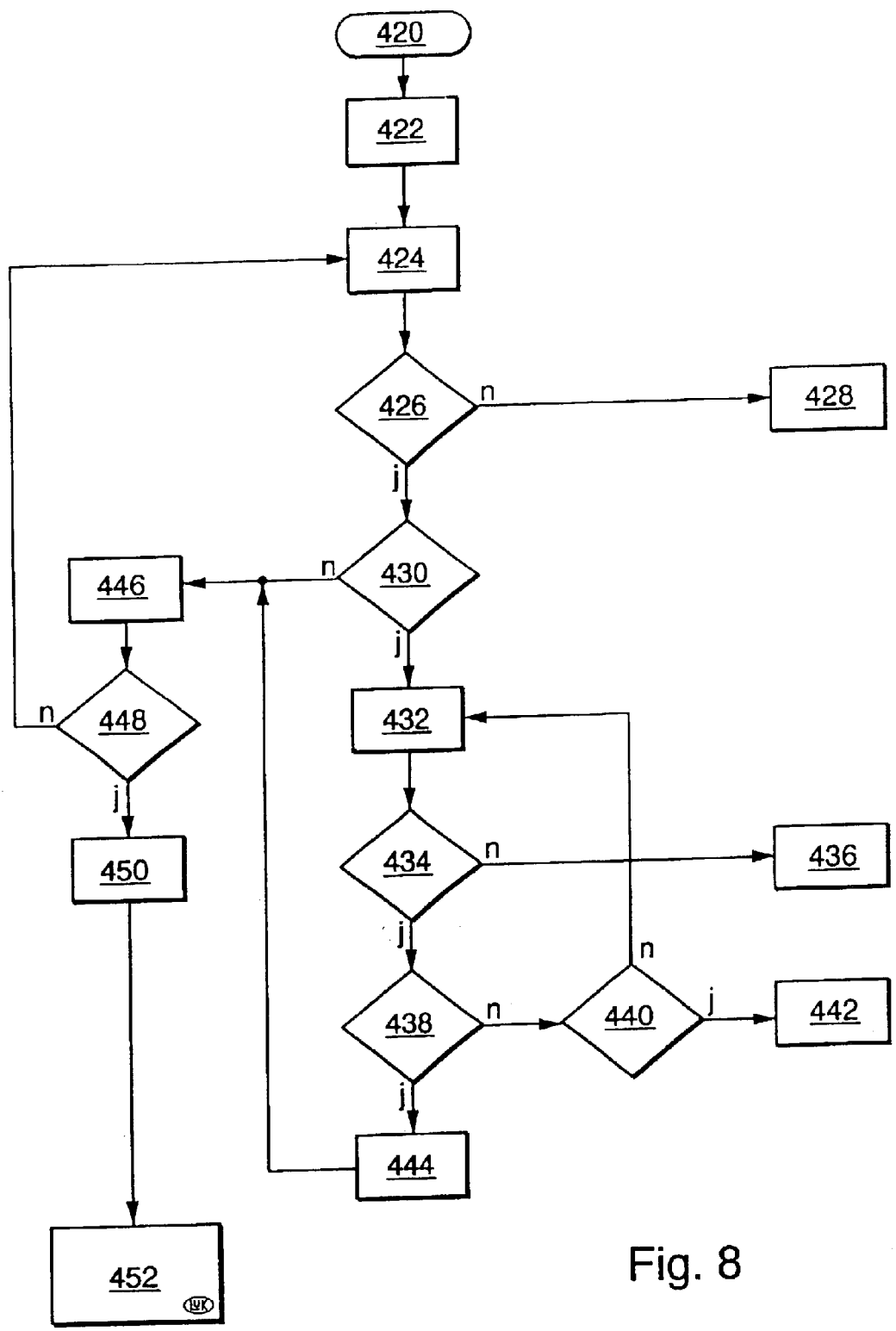
FIG. 8 represents a first example of a flow chart of a method according to the invention.

FIG. 8 represents an example in flow-chart format, where the method according to the invention is used as an emergency procedure to move the transmission into predetermined positions within the selecting/shifting track pattern and to detect the predetermined positions. The same procedure can also be used to adjust or calibrate a displacement sensor device.

The procedure is started at step 420. In step 422 a shake-down phase is initiated to ensure that the shifter finger or a movable element connected to the latter is settled into an unbiased, force-free condition.

In step 424, the shifter finger is moved back and forth in the selector direction. In step 426, a test is performed whether end stops were detected in step 424. This test is made by measuring the total current of the control device. If no stops were detected in step 426, the process is terminated in step 428. In the affirmative case of step 426, i.e., if end stops were detected, a further test is made in step 430, whether the time interval from detecting one stop to the other was shorter than a predetermined amount of time. As the process is directed through the voltage transmitted by the control device, the fact that the time interval between opposite end stops was shorter than a predetermined value can be used as an indicator that the shifter finger is positioned in a shift track. In the negative case of step 430, i.e., if the time interval between end stops is found to be longer than a predetermined amount of time, this can serve as an indicator that the shifter finger is positioned in the selector track. The method proceeds to step 446, which will be described below after step 444.

In the affirmative case of step 430, i.e., if the time interval is shorter than a predetermined amount, the method continues in step 432, where the shifter finger is moved back and forth in the shift direction. In step 434, a test is performed as to whether or not end stops were detected in the back-and-forth movement of step 432. As in step 426, this test is based on measuring the total current of the control device. In the affirmative case of step 434, i.e., if end stops were detected, a test is made in step 438, whether the selector track has been found. The detection of the selector track can be based, e.g., on a detent at the intersection of the selector track and the shift track which produces a characteristic response in the total current signal of the control device when the shifter finger reaches the selector track.

In the negative case of step 438, i.e., if the selector track was not detected, a further test is made in step 440 whether the number of times that the method failed to detect the selector track exceeds a given threshold number. In the affirmative case, the process is terminated in step 442. In the negative case, the method loops back to step 432.

If step 438 indicates that the shifter finger has reached the selector track (i.e., the contact feeler element has reached the corresponding detent position of the surface profile), a vibratory or shake-down phase is initiated in step 444 to ensure a settled, bias-free position in the selector track. Subsequently, in step 446, the shifter finger is moved in the selector track direction towards the shift track of first/second gear. As mentioned above, step 446 is also performed after a negative outcome of step 430.

Next, a test is made in step 448 by measuring the total current of the control device, whether or not a stop was detected in the selector track. In the negative case, the method loops back to step 424. In the affirmative case, a shake-down process is performed in step 450 to settle the shifter finger in a defined position in the selector track between first and second gear.

Step 452 collectively represents the continuation of the method in which the shifter finger is moved under voltage control into the positions of first and second gear as well as fifth and reverse gear, while monitoring the current during the movement.

Figure 9:
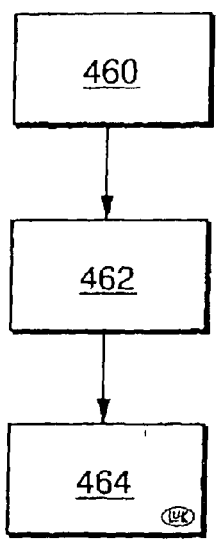
FIG. 9 represents a second example of a flow chart of a method according to the invention.

FIG. 9 illustrates another application of the inventive method to take a gear out of engagement and to detect when the selector track has been reached.

In step 460, the shifter finger is actuated by forces in the shift direction as well as the selector direction. The force in the shift direction is oriented towards the selector track. The total current of the control device is monitored over time. In step 462, the total current is found to be decreasing. This serves as an indicator that the shifter finger, which was previously constrained by the shifter track, has left the latter and has become free to move in the selector track.

In step 464, the shifter motor is switched off, after a small voltage pulse may have been applied in the shift direction (optional).

Figure 10:
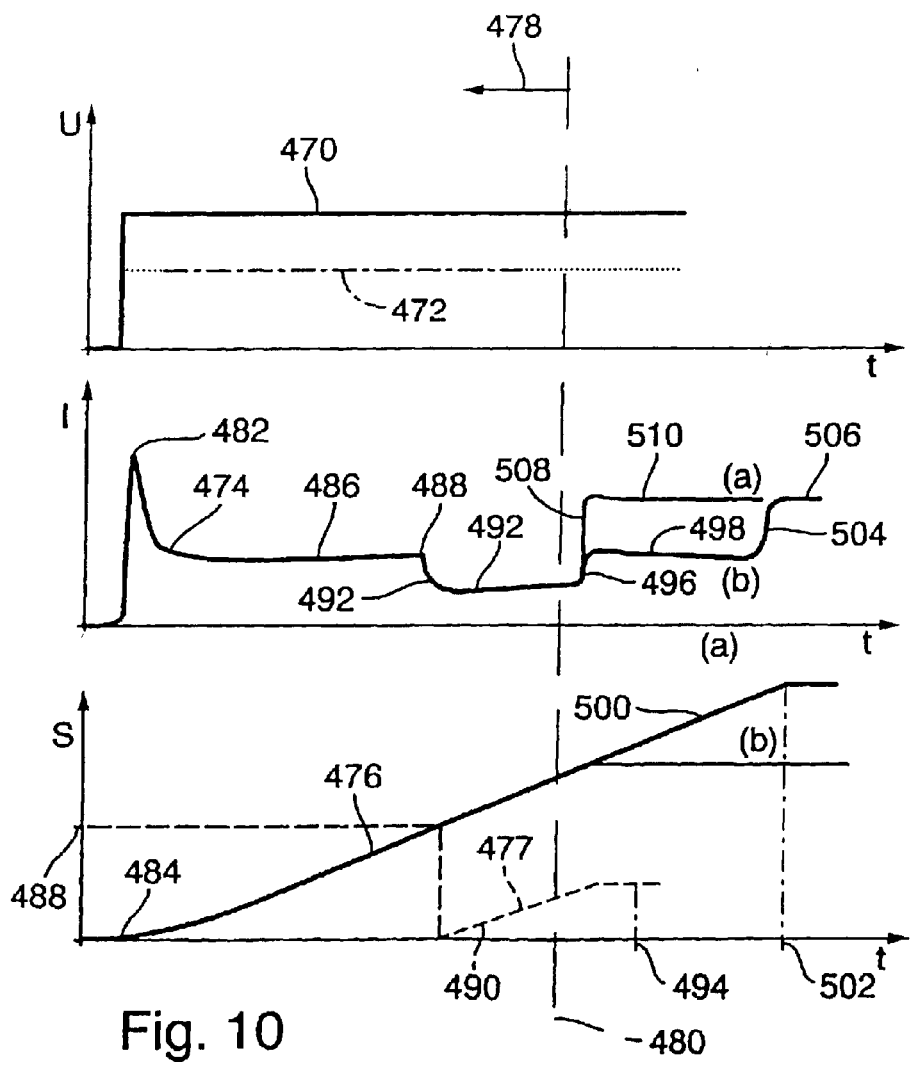
FIG. 10 represents time profiles of several different characteristic variables which can be used according to the invention to detect predetermined shift positions.

FIG. 10 represents time graphs of different characteristic variables during a time phase when the inventive method is being performed. In particular, FIG. 10 serves to explain how the invention proposes to detect positions of the shifter finger based on the time profiles of certain characteristic electrical variables.

The three graphs of FIG. 10 represent the voltages 470 and 472 of the selector motor and the shifter motor, respectively, the total current 474 delivered by the control device, and the displacement components 476 and 477 of a movable element in the shift and selector directions, respectively. The movable element is in particular a shifter finger.

In the left-hand portions of the time graphs 470, 472, 474, 476, 477, as indicated by the broken line 480 and the arrow 478 pointing towards the left, a profile graph is illustrated from which a position in the selector track can be recognized.

The continuation of the time graphs 470, 472, 474, 476, 477 to the right of the broken line 480 will serve to explain through an example how positions and states of the shifter finger can be detected on the basis of the time profiles of the illustrated variables.

The method is performed under voltage control. This means that a substantially constant voltage is used to energize the shifter and selector motor, so that the voltage signals 470, 472 have constant values. It should be noted at this point, that the scope of the invention nevertheless also includes a control that works with variable voltages.

The start of the shifter and selector motors causes a current surge in the control device at the point 482. At this point in time, the shifter finger is constrained in a shift track, so that it can only move in the shift direction as can be seen in the area 484 of the displacement graph.

After the start-up phase of the motors, the current in the control device decreases and continues at an essentially constant level during the phase 486. As the shifter finger is constrained by the shift track from moving transverse to the latter, it can only advance in the shift direction, as indicated by the increasing displacement in the bottom graph of FIG. 10. At the position 488 in the displacement graph, the shifter finger has essentially reached the selector track. Due to the actuation force of the selector motor, the shifter finger from this point on can also move in the selector direction, as indicated by the portion 490 of the displacement graph.

As the shifter finger is no longer constrained by the shift track and begins to move in the selector direction, the total current of the control device decreases and settles at an essentially constant level in the area 492.

By detecting the foregoing development in the current profile, it is possible to determine that the movable element has reached the selector track.

The continuation of the graphs in FIG. 10 to the right of the broken line 480 represents two cases (a) and (b) which can occur alternatively. If at the time 494, the shifter finger runs into a stop in the selector direction while the selector motor continues to receive a voltage as shown by the graph 472, the total current increases as shown at 496 and then settles at a higher, essentially constant level 498. The shifter finger continues to move in the shift direction, as shown in the portion 500 of the displacement graph. If at the time 502, the shifter finger runs into a stop in the shift direction, the current increases again in the area 504 and then settles again at a higher, essentially constant level 506.

If the shifter finger at the time 494 is blocked both in the shift and selector direction, the total current of the control device will rise to a higher level in the area 508, essentially equal to the current level 506. Thus, a higher current level that reflects blockage in both directions can be detected already between the times 494 and 502 and interpreted as a position where the movable element is constrained from further movement by stops in both directions.

Figure 11:
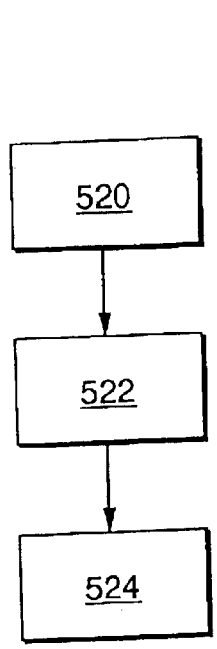
FIG. 11 represents a third example of a flow chart of a method according to the invention.

FIG. 11 shows as an example in flow-chart format how limitations in the lengthwise direction of the selector track can be detected.

In step 520, the selector motor is energized with current, so that the shifter finger moves in the lengthwise direction of the selector track.

In step 522, a rise in the total current of the control device is detected, indicating that the shifter finger has reached a stop at the end to the selector track.

In step 524, the selector motor is switched off.

Figure 12:
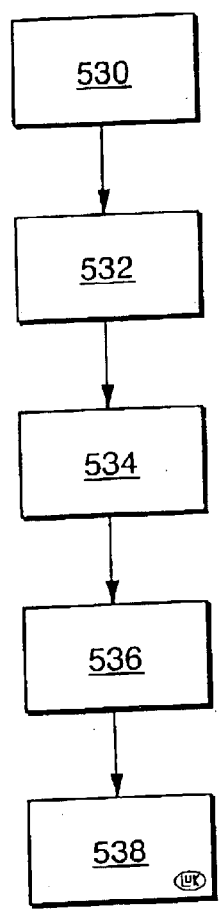
FIG. 12 represents a fourth example of a flow chart of a method according to the invention.

FIG. 12 shows as an example in flow-chart format how the inventive method can be used under an emergency procedure to put the transmission into predetermined gears, such as first, second and reverse gear.

In step 530, a voltage is applied to the shifter motor to move the shifter finger along a shift track.

In step 532, a rise in the current of the control device is detected, which is followed by the detection of a decrease in current in step 534. This indicates that the shifter finger has run into a kind of temporary barrier in the shift direction. This happens when a synchronization point is reached, which temporarily blocks the shifting movement and causes the current to rise. After the rpm rates are synchronized, the blockage is released so that the shifter finger can continue its movement in the shift direction, which causes the current to decrease again.

In step 536, the current is found to increase again and to remain at the increased level for at least a predetermined length of time. This can be interpreted as an indication that the shifter finger has reached the dead end of the shift track. The shifter motor is switched off at this point. Subsequently, voltage pulses of alternating polarity are applied to the shifter motor in order to cause the shift mechanism to settle in a bias-free position.

In step 538, the shifter motor is switched off, after a predetermined time period has elapsed, for example 200 to 1000 milliseconds. Delaying the switch-off point by a predetermined amount serves to ensure that the shifter finger is not at a synchronization point.

Figure 13:
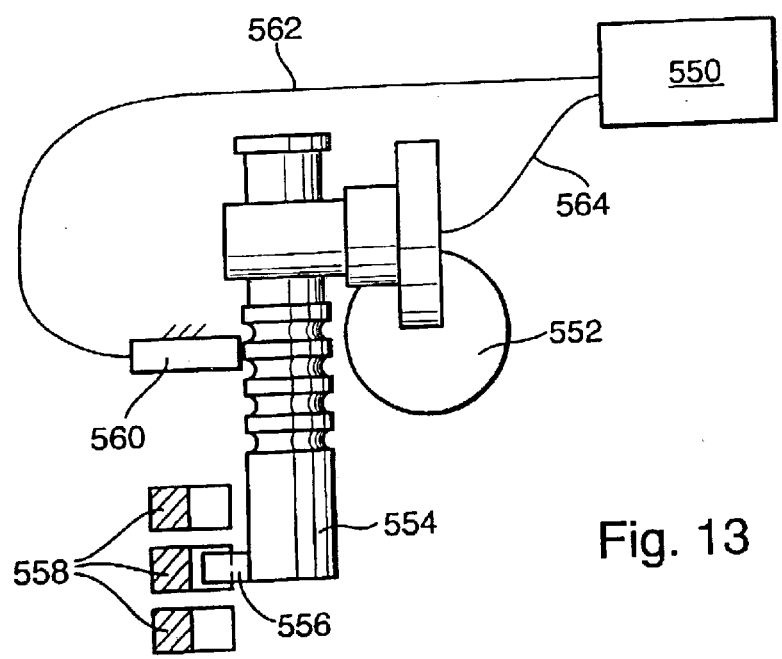
FIG. 13 represents a schematic view of portions of a transmission in which the method according to the invention can be used.

FIG. 13 represents a schematic view of portions of a transmission according to the invention.

The components of the transmission that are shown include in particular a control device 550, a selector motor 552, a shifter shaft 554, a shifter finger 556, and a shifting rod 558. A shifter motor is not shown in this example.

An incremental sensor device for the displacement in the selector direction is arranged at the selector motor (not shown).

An additional incremental displacement sensor 560 is arranged as a redundant means of detecting displacement in the selector direction.

The redundant incremental displacement sensor 560 as well as the selector motor 552 have signal connections to the control device 550, as symbolized by the lines 562 and 564.

The redundant incremental displacement sensor 560 uses a non-contacting principle to sense a surface profile of the shifter shaft 554 as the latter moves along the sensor. The sensor 560 is based, e.g., on the Hall-effect sensor principle or an inductive sensor principle.

Figure 14:
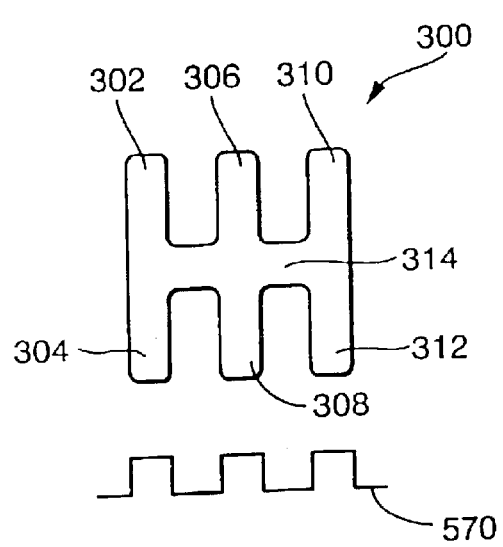
FIG. 14 represents a schematic view of a shift pattern correlated with a first signal profile.
Figure 15:
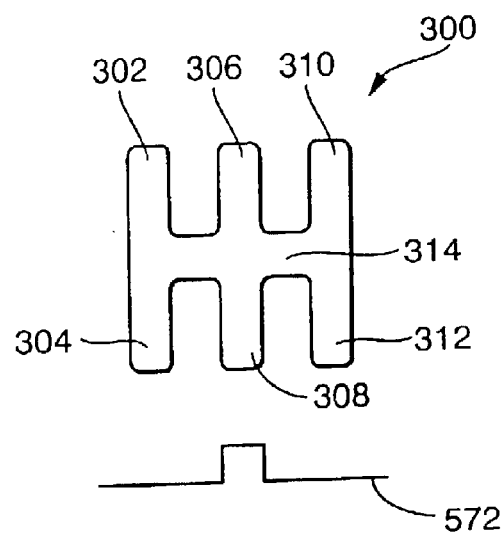
FIG. 15 represents a schematic view of a shift pattern correlated with a second signal profile.

Each of the FIGS. 14 and 15 shows a selecting/shifting track arrangement.

The graphs 570 and 572 below the representations of the selecting/shifting track arrangements represent sensor signals of the kind that could be produced by the redundant incremental displacement sensor of FIG. 13. As shown in FIG. 14, the sensor or switch 560 could give a signal when the shifter finger has reached one of the positions where the shift tracks branch off from the selector track.

Alternatively, the sensor 560 could also be designed to give a signal only when the shifter finger is at one specific position within the selector track, e.g., the middle shift track in a double-H arrangement.

With preference, the redundant incremental displacement sensor 560 for the selector direction has a coarser measuring resolution than the primary incremental sensor device that is arranged, e.g., at the selector motor.

Figure 16:
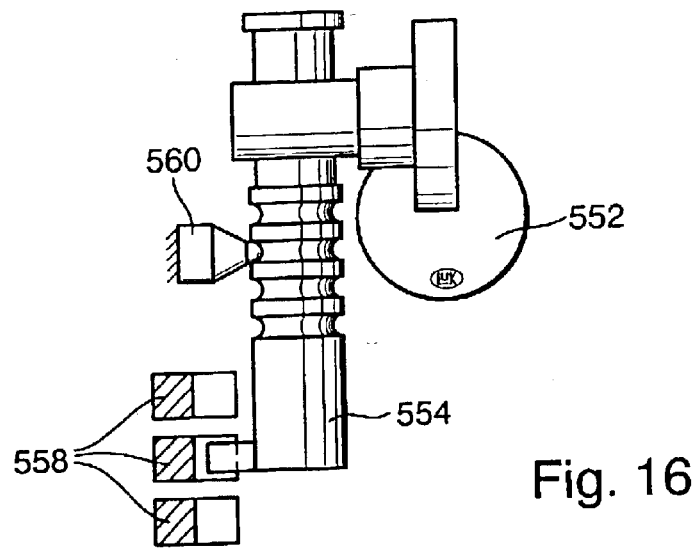
FIG. 16 represents an arrangement analogous to FIG. 13, with a different kind of redundant displacement sensor.

The arrangement of FIG. 16 differs from FIG. 13 essentially in the redundant incremental displacement sensor which in the case of FIG. 16 is configured as a mechanical, spring-biased contact feeler element that follows a contour profile of the shifter shaft 554.

Figure 17:
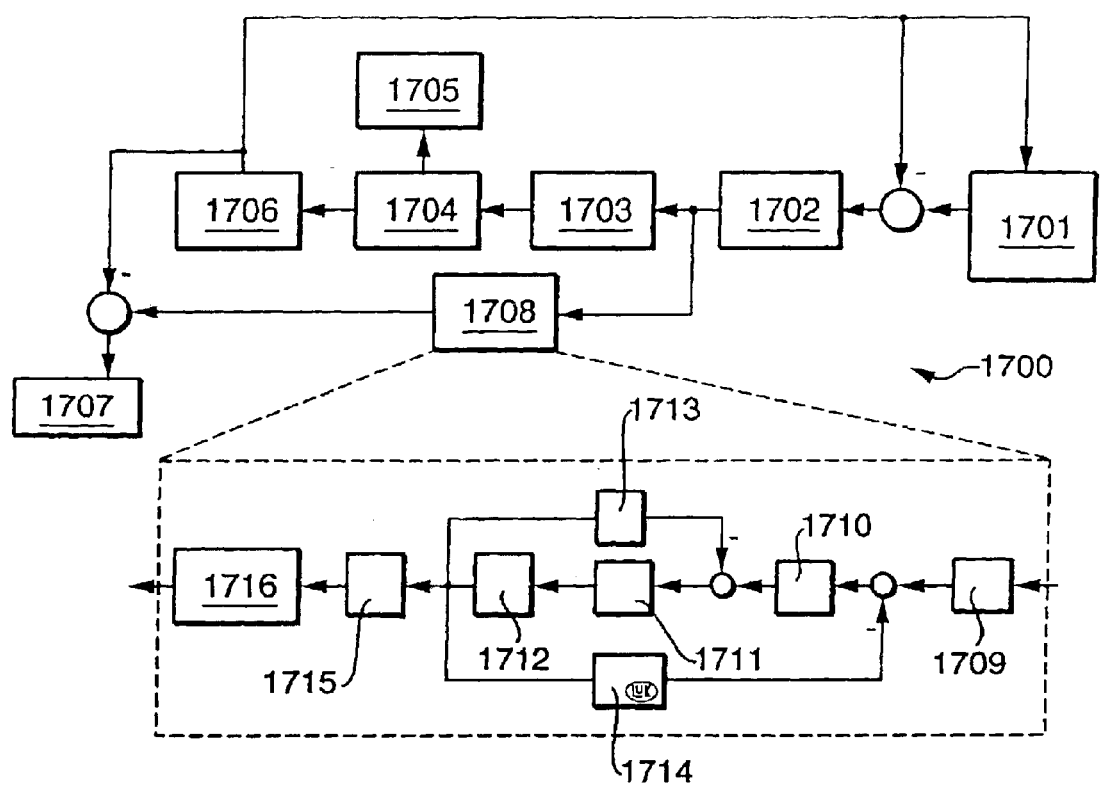
FIG. 17 represents an example of a block-diagram model of an actuator device.

The block diagram 1700 of FIG. 17 represents a schematic model of an actuator device. A target value is generated in the electric control device 1701 of the transmission and sent to a position regulator 1702 which, as a result, generates a corresponding voltage $U_A$. The voltage $U_A$ is transmitted by way of an output stage 1703 and serves to control an actuator device such as a rotary electric motor 1704. The actuator device 1704 moves the actual shifter elements of the transmission 1705 by way of a motion-transfer mechanism (not shown). In the case of a shift transmission that works in discrete steps through different gear pairs, the shifter elements are the sliding sleeves that engage and disengage the free gears. An incremental displacement sensor 1706 generates a signal indicating the position or a change in the position of a movable element in relation to a reference point. In another embodiment, it may also be advantageous to use other kinds of displacement sensors including, e.g., absolute displacement sensors such as potentiometers. The signal generated by the displacement sensor 1706 is fed back to blocks 1701 and 1702 and at the same time transmitted to an error-detection unit 1707. The voltage $U_A$ generated in block 1702 is further entered into an emulator unit 1708, i.e., a computer model of an actuator device that is implemented in an electrical control device.

The portion of FIG. 17 that is framed by a broken line illustrates the details of the block 1708, i.e., an emulation of a drive source for an actuator, in this case a rotary electric DC motor. The model uses an appropriate transfer function to generate a signal that is equivalent to the displacement signal generated by the incremental displacement sensor 1706 as a result of a voltage signal $U_A$ coming out of block 1702. The transfer function of the emulator model 1708 is based on the following set of equations:

$$U_A = R_A \cdot I_A + C_M \cdot \omega_M \quad (1)$$

$$M_A = C_M \cdot I_A \quad (2)$$

$$J_M \cdot \dot{\omega}_M = M_A - d \cdot \omega_M \quad (3)$$

$$\Rightarrow \dot{\omega}_M = \frac{C_M}{R_A \cdot J_M} \cdot U_A - \left( \frac{C_M^2}{R_A \cdot J_M} + \frac{d}{J_M} \right) \cdot \omega_M \quad (4)$$

The symbols used in the foregoing equations will be defined in the next-following paragraph below. The transfer function corresponding to equations (1) to (4) describes a servo-loop of a type known as $IT_1$ (integrating control loop with a time lag). To represent the entire control loop consisting of the control device and the actuator device, a transfer behavior known as $PT_2$ (proportional control with a second-order time lag) will be entirely adequate. An alternative embodiment is conceivable where the emulator model would be used alone without the incremental position sensor to determine a change in position an/or the position itself in relation to a reference point. In this latter case, it is advantageous to use a more advanced model of the actuator drive mechanism.

The emulator model 1708 in FIG. 17 is represented in detail by the functional blocks 1709 to 1716. In block 1709, the input quantity $U_A$ is multiplied by the reciprocal value $1/R_A$ of the rotor resistance $R_A$ of the actuator motor. After block 1710, the feedback from block 1714 is subtracted. Block 1710 performs a division by the moment of inertia $J_M$ of the rotor of the actuator motor. After block 1710, the feedback from block 1713 is subtracted. In block 1712, an integration is performed to calculate the angular velocity $\omega_M$ of the actuator motor. In block 1714, the result of block 1712 is multiplied by the velocity-dependent friction constant d of the actuator drive and fed back to the output of block 1709. In block 1713, the result of block 1712 is multiplied by the quotient $C_M/R_A$ and fed back to the output of block 1710. A further integration of the angular velocity $\omega_M$ in block 1715 produces the angular position $\phi_M$. In block 1716, the angular position $\phi_M$ (e.g. in radian units) is converted to a quantity that corresponds to the increments measured by the incremental position sensor.

Figure 18:
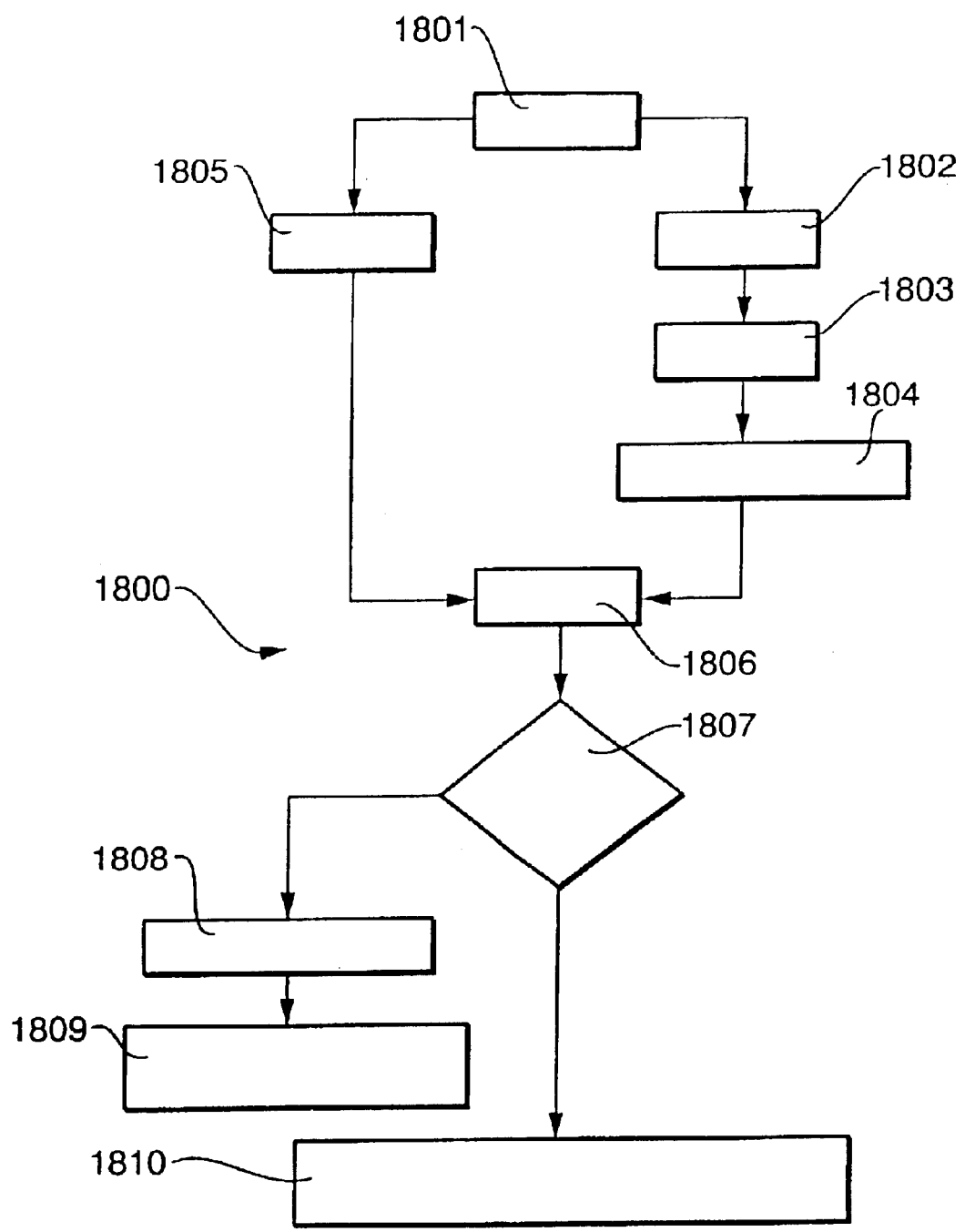
FIG. 18 represents an example of a flow chart of an error-detection strategy.

FIG. 18 shows an example of an error-detection strategy in block-diagram format. Block 1801 of the block diagram 1800 stands for a position controller generating a control signal and sending it simultaneously along two different paths. From the left-hand output of block 1801, the control signal is fed through an end stage (block 1802) to a drive motor (block 1803) causing a position change which, in turn, is detected by a displacement sensor (block 1804) such as an incremental position sensor. From the right-hand output of block 1801, the same control signal is sent to an emulator model of the drive motor (block 1805) which computes a signal that is the theoretical counterpart of the actually detected signal of block 1804. In block 1806, the difference between the actual and the theoretical signal is determined. Block 1807 performs a comparison whether or not the difference is larger than a given threshold value. In the affirmative case of block 1807, an entry is made into an error memory (block 1808), and an error-managing strategy is initiated in block 1809. In the negative case of block 1807, the displacement-sensor signal is accepted as correct. In block 1810, the emulator model (block 1805) is adjusted so that the computed signals values of the emulator model (block 1805) will more closely match the actual signal values of the displacement sensor (1804).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A method of detecting a change in position relative to a reference point of a transmission that is shiftable into a plurality of shift positions corresponding to different rotary transfer ratios between an input shaft and an output shaft, wherein changes from one shift position to another are associated with movements of a first shifter element in a two-dimensional shift pattern comprising a selector track and shift tracks, a first electrical actuator actuates movements along the selector track, and a second electrical actuator actuates movements along the shift tracks, at least one of the actuators comprises a displacement-sensor device, and the transmission comprises an electrical control device to control the actuators; the method comprising the step of emulating at least one of the actuators by means of a model in the electrical control device, wherein the model serves to detect a malfunction of the displacement-sensor device, wherein the model produces an emulator output signal, the at least one actuator produces an actuator output signal, and the malfunction is detected by finding a difference between said output signals.

2. The method of claim 1, wherein the actuator emulation is performed by means of a control-loop emulator.

3. The method of claim 2, wherein the at least one actuator and the control-loop emulator are given equivalent input signals.

4. The method of claim 3, wherein a voltage is used as input signal for the control-loop emulator.

5. The method of claim 4, wherein the voltage comprises the input voltage of a position controller.

6. The method of claim 2, wherein the control-loop emulator generates an emulator output signal that is equivalent to a displacement-sensor output signal.

7. The method of claim 6, wherein the emulator output signal comprises one of an angular position and a quantity from which an angular position can be calculated.

8. The method of claim 7, wherein the emulator output signal corresponds to a magnitude of an angle expressed as a number of increments.

9. The method of claim 7, wherein the emulator output signal corresponds to a magnitude of an angle expressed in radian units.

10. The method of claim 2, wherein the control-loop emulator uses characteristic variables of the actuator device that is being emulated.

11. The method of claim 10, wherein the characteristic variables comprise at least one of an rpm rate and a rotary acceleration of the actuator device that is being emulated.

12. The method of claim 2, wherein the control-loop emulator uses characteristic design parameters of the actuator device that is being emulated.

13. The method of claim 12, wherein actuator device comprises an electric motor with a rotor and a stator and the characteristic design parameters comprise at least one of a moment of inertia, an electrical resistance, and a torque constant of the rotor.

14. The method of claim 2, wherein the control-loop emulator uses at least one measured quantity of the actuator device that is being emulated.

15. The method of claim 14, wherein the measured quantity consists of a speed-dependent amount of friction.

16. The method of claim 1, wherein an error-managing strategy is initiated after detecting the malfunction.

17. The method of claim 16, wherein in addition an entry is made into an error memory.

18. A method of detecting a change in position relative to a reference point of a transmission that is shiftable into a plurality of shift positions corresponding to different rotary transfer ratios between an input shaft and an output shaft, wherein changes from one shift position to another are associated with movements of a first shifter element in a two-dimensional shift pattern comprising a selector track and shift tracks, a first electrical actuator actuates movements alone the selector track, and a second electrical actuator actuates movements along the shift tracks, at least one of the actuators comprises a displacement-sensor device, and the transmission comprises an electrical control device to control the actuators; the method comprising the step of emulating at least one of the actuators by means of a model in the electrical control device, wherein the actuator emulation is performed by means of a control-loop emulator, wherein the control-loop emulator generates an emulator output signal that is equivalent to a displacement-sensor output signal, wherein the emulator output signal is used as a substitute for the displacement-sensor output signal to control the actuator that is being emulated.

19. A method of detecting a change in position relative to a reference point of a transmission that is shiftable into a plurality of shift positions corresponding to different rotary transfer ratios between an input shaft and an output shaft, wherein changes from one shift position to another are associated with movements of a first shifter element in a two-dimensional shift pattern comprising a selector track and shift tracks, a first electrical actuator actuates movements along the selector track, and a second electrical actuator actuates movements along the shift tracks, at least one of the actuators comprises a displacement-sensor device, and the transmission comprises an electrical control device to control the actuators; the method comprising the step of emulating at least one of the actuators by means of a model in the electrical control device, wherein at a time when the displacement sensor device is fully functional, if a discrepancy is detected between the emulator output signal and the displacement-sensor output signal, an adjustment is made to reduce said discrepancy.

20. The method of claim 19, wherein said adjustment consists of adapting the model so that the emulator output signal will more closely match the displacement-sensor output signal.

21. A control device for a vehicle transmission, said transmission comprising: a shift pattern with a selector track and shift tracks; a first shifter element, movable in the shift pattern; a second shifter element; a first electrically controlled actuator device for actuating for actuating movements along the selector track, and a second electrically controlled actuator device for actuating movements along the shift tracks; a position-sensor device for detecting a current position of at least one of said shifter elements; wherein the control device comprises an emulator model of at least one of the actuator devices, wherein the model serves to detect a malfunction of the position-sensor device and the model produces an emulator output signal, the at least one actuator produces an actuator output signal, and the malfunction is detected by finding a difference between said output signals.

22. A control device for a vehicle transmission, said transmission is shiftable into a plurality of shift positions corresponding to different rotary transfer ratios between an input shaft and an output shaft, comprising: a two-dimensional shift pattern with a selector track and shift tracks; wherein changes from one shift position to another are associated with movements of a first shifter element in the shift pattern, a the first shifter element, being movable in the shift pattern; a second shifter element; a first electrical actuator actuates movements along the selector track, and a second electrical actuator actuates movements along the shift tracks, at least one the actuators comprises a displacement-sensor device, wherein the control device comprises an emulator model of at least one of the actuator devices, wherein at a time when the displacement sensor device is fully functional, if a discrepancy is detected between the emulator output signal and the displacement-sensor output signal, an adjustment is made to reduce the discrepancy.

* * * * *

UNITED STATES PATENT AND TRADEMARK OFFICE
CERTIFICATE OF CORRECTION

PATENT NO. : 6,785,599 B2
DATED : August 31, 2004
INVENTOR(S) : Reinhard Berger et al.

It is certified that error appears in the above-identified patent and that said Letters Patent is hereby corrected as shown below:

<u>Title page,</u>
Item [73], Assignee, please delete "LUK Lamellen und Kupplungsbau Beteiligungs KG" and substitute -- LuK Lamellen und Kupplungsbau Beteiligungs KG --.

Signed and Sealed this

Eleventh Day of January, 2005

JON W. DUDAS
*Director of the United States Patent and Trademark Office*